US011772042B2

(12) United States Patent
Caldwell

(10) Patent No.: US 11,772,042 B2
(45) Date of Patent: Oct. 3, 2023

(54) CARBON CAPTURE FILTRATION SYSTEM AND METHOD

(71) Applicant: Robert L. Caldwell, Bethel, CA (US)

(72) Inventor: Robert L. Caldwell, Bethel, CA (US)

( * ) Notice: Subject to any disclaimer, the term of this patent is extended or adjusted under 35 U.S.C. 154(b) by 241 days.

(21) Appl. No.: 17/234,629

(22) Filed: Apr. 19, 2021

(65) Prior Publication Data

US 2021/0322922 A1 Oct. 21, 2021

Related U.S. Application Data

(60) Provisional application No. 63/012,118, filed on Apr. 18, 2020.

(51) Int. Cl.
| | | |
|---|---|---|
| *B01D 53/14* | (2006.01) | |
| *B01D 53/18* | (2006.01) | |
| *C02F 11/12* | (2019.01) | |
| *C02F 11/121* | (2019.01) | |
| *C02F 103/18* | (2006.01) | |

(52) U.S. Cl.
CPC ..... *B01D 53/1475* (2013.01); *B01D 53/1431* (2013.01); *B01D 53/1493* (2013.01); *B01D 53/18* (2013.01); *C02F 11/121* (2013.01); *C02F 2103/18* (2013.01)

(58) Field of Classification Search
None
See application file for complete search history.

(56) References Cited

FOREIGN PATENT DOCUMENTS

KR 20120029666 A * 3/2012 ............. B01D 47/06

OTHER PUBLICATIONS

KR20120029666A English Translation obtained from Espacenet, pp. 1-7. (Year: 2023).*

* cited by examiner

*Primary Examiner* — Youngsul Jeong
(74) *Attorney, Agent, or Firm* — J. Steven Svoboda

(57) ABSTRACT

A system includes: an intake tube operably connected to a power plant, the intake tube configured to transport exhaust from the power plant; a drill configured to create a hole in the side of the plant usable to receive exhaust generated by the plant, the drill configured to remain in place and function as the intake tube, the system further comprising a cooling tube operably connected to the intake tube, the cooling tube configured to receive the exhaust from the intake tube; a U-shaped tube operably connected to the cooling tube, the U-shaped tube comprising a mister configured to generate a mist; and a vacuum tube fan operably connected to the U-shaped tube, the mister configured to cause the cooled exhaust and the heated liquid to bond so as to create a sludge, the sludge falling to a bottom of the system, the sludge being removed from the system.

20 Claims, 6 Drawing Sheets

CARBON CAPTURE FILTRATION SYSTEM AND METHOD

SUMMARY

Embodiments of the invention relate in general to a carbon capture filtration system and method.

A carbon capture filtration system configured for installation to a power plant includes: an intake tube operably connected to a smokestack of the power plant, the intake tube configured to transport exhaust from the smokestack, the intake tube comprising a drill configured to create a hole in the side of the smokestack usable to receive exhaust generated by the plant, the drill configured to remain in place and function as the intake tube; a cooling tube operably connected to the intake tube, the cooling tube configured to receive the exhaust from the intake tube, the cooling tube further configured to cool the exhaust to a mixing temperature; a U-shaped tube operably connected to the cooling tube, the U-shaped tube configured to receive the exhaust from the cooling tube, the U-shaped tube comprising a mister configured to generate a mist; a hot liquid delivery tube operably connected to the cooling tube, the hot liquid delivery tube configured to receive hot liquid from the cooling tube, the hot liquid delivery tube transmitting to the mister hot liquid heated to the mixing temperature; and a vacuum tube fan operably connected to the U-shaped tube, the vacuum tube fan configured to vacuum the exhaust from the smokestack, the vacuum tube fan further configured to deliver the exhaust to the U-shaped tube, wherein the mister is further configured to receive a hot liquid, the mister further configured to receive the cooled exhaust from the cooling tube, the mister further configured to cause the cooled exhaust and the heated liquid to bond so as to create a carbon-containing slurry, the slurry falling to a bottom of the system, the slurry being removed from the system, thereby substantially reducing pollution generated by the plant.

A carbon capture filtration system configured for installation to a power plant includes: an intake tube operably connected to a smokestack of the coal-fired power plant, the intake tube configured to transport exhaust from the smokestack, the intake tube comprising a drill configured to create a hole in the side of the smokestack usable to receive exhaust generated by the plant, the drill configured to remain in place and function as the intake tube; a cooling tube operably connected to the intake tube, the cooling tube configured to receive the exhaust from the intake tube, the cooling tube further configured to cool the exhaust to a mixing temperature, the cooling tube comprising a cooler, wherein the cooler comprises one or more of a liquid-based cooler and a refrigerant-based cooler; a U-shaped tube operably connected to the cooling tube, the U-shaped tube configured to receive the exhaust from the cooling tube, wherein the U-shaped tube comprises a shape generally resembling a letter U, wherein the U-shaped tube comprises two U-shaped tube branches, a first U-shaped tube branch that is operably connected to a first intake tube end of the intake tube, the first U-shaped tube branch immediately adjacent to the first intake tube end, the U-shaped tube further comprising a second U-shaped tube branch that is distal from the first intake tube end, the U-shaped tube comprising a mister configured to generate a mist; a hot liquid delivery tube operably connected to the cooling tube, the hot liquid delivery tube configured to receive hot liquid from the delivery tube, the hot liquid delivery tube transmitting to the mister hot liquid heated to the mixing temperature, the second U-shaped tube branch further comprising a U-shaped tube fan configured to draw the exhaust upward into the second U-shaped tube branch and toward a top of the system, wherein the cooling tube slants slightly downward towards the U-shaped tube, allowing exhaust particles that drop to the bottom of the cooling tube to flow by gravity to the U-shaped tube; a vacuum tube fan operably connected to the U-shaped tube, the vacuum tube fan configured to vacuum the exhaust from the smokestack, the vacuum tube fan further configured to deliver the exhaust to the U-shaped tube, wherein the mister is further configured to receive a hot liquid, the mister further configured to receive the cooled exhaust from the cooling tube, the mister further configured to cause the cooled exhaust and the heated liquid to bond so as to create a carbon-containing slurry; and a slurry processing assembly located at a bottom of the U-shaped tube, the slurry processing assembly separating hot liquid from the slurry, the slurry processing assembly comprising a filter, the filter configured to separate the hot liquid from the slurry, wherein the filter is positioned at a non-zero filter angle relative to the ground, causing the hot liquid to flow through the filter, while sludge that is stopped by the filter slides down the filter to a bottom front of the filtration system, the sludge falling to a bottom of the system, the sludge being removed from the system, the slurry processing assembly further comprises a hot liquid cooler configured to cool the hot liquid, creating cool liquid, the system reusing the cool liquid to supply the cool liquid to the liquid-based coolers, wherein the system controls the bonding of the molecules by varying one or more of a speed of the U-shaped tube fan and the mixing temperature the system thereby substantially reducing pollution generated by the plant, wherein the pollutants removed from power plant exhaust by the system comprise one or more of carbon dioxide, carbon monoxide, hydrocarbons, sulfur dioxide, nitrous oxide, nitrogen dioxide, and mercury, the system thereby generating reusable carbon.

A carbon capture filtration method includes: drilling a small hole in a smokestack of a power plant; pushing a molly through the small hole; locking the molly in place inside the smokestack; drilling a large hole in the smokestack using a drill, the large hole enlarging the small hole, the drill comprising the molly, the molly operably connected by a threaded rod to an end cap of the drill, wherein the molly is configured to help the drill to penetrate the smokestack; following completion of drilling, allowing the drill to stay in place to become an intake tube configured to transport exhaust from the smokestack, the intake tube further configured to transmit the exhaust to a cooling tube operably connected to the intake tube, the cooling tube configured to cool the exhaust to a mixing temperature; a U-shaped tube operably connected to the cooling tube, the U-shaped tube configured to receive the exhaust from the cooling tube, the U-shaped tube comprising a mister configured to generate a mist; a hot liquid delivery tube operably connected to the cooling tube, the hot liquid delivery tube configured to receive hot liquid from the cooling tube, the hot liquid delivery tube transmitting to the mister hot liquid heated to the mixing temperature, the U-shaped tube operably connected to a vacuum tube fan configured to vacuum the exhaust from the smokestack, the vacuum tube fan further configured to deliver the exhaust to the U-shaped tube, wherein the mister is further configured to receive a hot liquid, the mister further configured to receive the cooled exhaust from the cooling tube, the mister further configured to cause the cooled exhaust and the heated liquid to bond so as to create a carbon-containing sludge, the sludge falling to a bottom of the system, the sludge being removed from the system; and extracting the molly through a drill center of the drill, thereby substantially reducing pollution generated by the plant.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1:
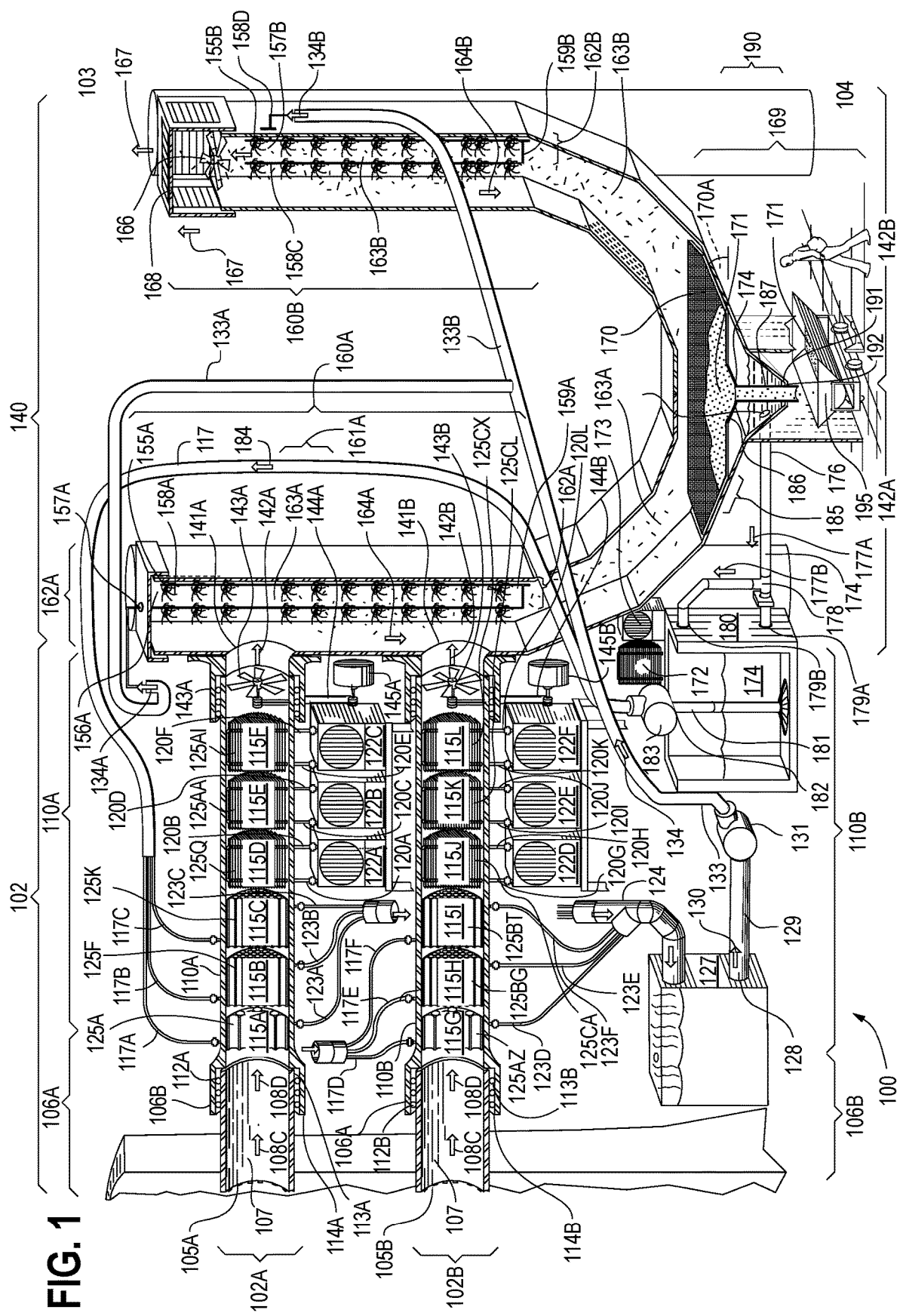
FIG. 1 is a drawing of a carbon capture filtration system installed on a smokestack.

This invention relates to a carbon capture filtration system and method.

The carbon capture filtration system and method comprises one or more pollutant vacuum tubes attachable to a smokestack of a coal-fired power plant, vacuums out the exhaust generated by the coal-fired power plant, and converts the exhaust to sludge, thereby substantially reducing exhaust levels, the system thereby generating reusable carbon.

Alternatively, or additionally, embodiments of the invention comprise a carbon capture filtration system and method suitable for use in any power plant.

The system attaches to the side of the smokestack using a drill. For example, the drill has a diameter between approximately four feet and approximately six feet. For example, a molly is usable to help penetrate a side wall of the smokestack and thereby facilitate the drill's entrance into the smokestack. The drill penetrates the side wall, where it stays in place to become the intake tube. The power plant does not need to be shut down for the drilling process. According to further embodiments of the invention, the drill is left in place without compromising the smokestack and functions as an intake tube thereafter.

Preferably, but not necessarily, the coolers comprise high-temperature steel. Preferably, but not necessarily, at least one of the coolers comprises wheels, facilitating one or more of cooler removal and cooler replacement. Most preferably, but not necessarily, each of the coolers comprises wheels, facilitating one or more of cooler removal and cooler tube replacement.

The first cooler is configured to fit snugly inside its respective pollutant vacuum tube. The first cooler preferably comprises cooling fins configured to absorb heat. The first cooler preferably has an outer diameter of approximately six feet and an inner diameter between approximately three feet and approximately 5.5 feet. Preferably, but not necessarily, the wheels comprise one or more of ceramic material and an equivalent.

Preferably, a number of pollutant contact tubes comprised in the first cooler is less than a number of pollutant contact tubes comprised in the second cooler. The smaller number of pollutant contact tubes comprised in the first cooler relative to the number of pollutant contact tubes comprised in the second cooler allows the pollutant contact tubes comprised in the first cooler to have a larger diameter, thereby allowing the hot liquid to move faster through the first cooler. Preferably, but not necessarily, the first cooler absorbs the most heat of the coolers.

The second cooler is configured to fit snugly inside its respective pollutant vacuum tube. The second cooler preferably has an outer diameter of approximately six feet and an inner diameter between approximately three feet and approximately 5.5 feet. Preferably, but not necessarily, the second cooler has an outer diameter of between approximately 5.5 feet and approximately six feet.

The second cooler preferably comprises cooling fins configured to absorb heat. For example, the openings between fins range from approximately three inches to approximately six inches.

Preferably, but not necessarily, each of the coolers comprises wheels, facilitating one or more of cooler removal and cooler replacement.

The third cooler is configured to fit snugly inside its respective cooler. In the case of a cooler having an inner diameter of approximately six feet, the third cooler has an inner diameter of approximately 5.5 feet. For example, the third cooler comprises wheels, facilitating one or more of cooler removal and cooler replacement. Preferably, but not necessarily, the wheels comprise one or more of ceramic material and an equivalent.

The third cooler preferably comprises cooling fins configured to absorb heat. For example, the openings between fins range from approximately two inches to approximately four inches. Preferably, but not necessarily, cooling fins comprised in the third cooler are closer to each other than the cooling fins comprised in the second cooler.

Preferably, but not necessarily, the third cooler has a diameter approximately equal to a diameter of the second cooler. The third cooler is configured to further slow down the exhaust and absorb further heat from the exhaust.

The pollutant vacuum tube slants slightly downward towards the U-shaped tube, allowing exhaust particles that drop to the bottom of the pollutant vacuum tube to flow by gravity to the U-shaped tube. For example, the pollutant vacuum tube slants downward at approximately a 5 degree angle. Alternatively, or additionally, the cooling tube slants slightly downward towards the U-shaped tube, allowing exhaust particles that drop to the bottom of the pollutant vacuum tube to flow by gravity to the U-shaped tube. For example, the cooling tube slants downward at approximately a 5 degree angle.

According to a set of embodiments of the invention, after the exhaust goes through the liquid-based coolers, it enters the first of three refrigerant-based coolers. The refrigerant-based cooler preferably comprises an evaporator. The evaporator preferably comprises wheels, facilitating one or more of evaporator removal and evaporator replacement. For example, for a cooling tube having an inner diameter of approximately six feet, the evaporator has an outer diameter of approximately 5.5 feet. For example, for a cooling tube having an inner diameter of approximately four feet, the cooler has an outer diameter of approximately 3.5 feet.

Again, all parts can be replaced without shutting down the power plant. Preferably, but not necessarily, one or more of an external condenser and an external compressor is located on the outside of the tubes. For purposes of this example involving three refrigerant-based coolers, located on the outside of the tubes are three total items selected from a group comprising external condensers and external compressors.

The system preferably comprises a backup condenser usable in case of a failure of the first condenser. The backup condenser is preferably located close to the condenser. A length of tubes comprised in the refrigerant system is preferably as short as possible. Preferably, but not necessarily, the system comprises a respective condenser and two respective compressors for each of the three evaporators.

The process of removal and replacement of one or more of the compressors, the misters, the pollutant vacuum tubes, and the vacuum tube fans should take less than four hours after practice and can be accomplished without turning off smokestack operation.

For example, the system comprises two pollutant vacuum tubes for each U-shaped tube. The two tubes are a first pollutant vacuum tube and a second pollutant vacuum tube, the top pollutant vacuum tube and the bottom pollutant vacuum tube preferably being spaced approximately ten to fifty feet apart from each other depending on the smokestack height.

The adapter plate fills a gap between the pollutant vacuum tube and the U-shaped tube. Alternatively, or additionally, the adapter plate houses part of the first liquid. The adapter plates are both half pipes and each has a cross-section of approximately 182 degrees. The adapter plates do one or more of bolt together and fasten together. For example, the adapter plates bolt together using a locking system that is one or more of easy to remove and easy to replace.

The purpose of the U-shaped tube is to take the cooled exhaust molecules and bond those molecules to the molecules of cool liquid, making them heavy so that they drop down to the filtration system.

The exhaust passes through the intake tube, then through the cooling tube, through the adapter plates, through the liquid, and then enters the U-shaped tube. Cooling of the exhaust and warming of the water and blending the two together allows bonding to take place between gaseous pollutants and the water, thereby dropping the pollutants, which eventually reaching a filtration system at the bottom of the U-shaped tube.

The material to make the intake tube preferably comprises stainless steel or an equivalent. The intake tube is preferably configured to withstand high temperatures of the smokestack. The intake tube is preferably further configured to withstand a weight of the concrete wall. Preferably, but not necessarily, an inside surface of the intake tube is substantially smooth. Accordingly, exhaust particles will not substantially accumulate on the side walls. Preferably, but not necessarily, a diameter of the intake tube ranges from approximately two feet to approximately eight feet. For example, representative intake tube diameters include approximately two feet, approximately four feet, and approximately six feet. For example, systems having an intake tube diameter of approximately two feet comprise a pickup tube feeding into the intake tube for use in cases with extreme exhaust issues.

The U-shaped tube comprises two separate sets of misters positioned across from each other in each of the two branches of the U-shaped tube. The misters mix the exhaust with hot liquid that has been heated to approximately the same mixing temperature before entering the mister. For example, a mixing temperature of the hot liquid differs from a mixing temperature of the exhaust by less than approximately 200 degrees Fahrenheit. Cooling of the exhaust and warming of the water and blending the two together allows bonding to take place between gaseous pollutants and the water, thereby creating bonded molecules that weigh more than the exhaust molecules. In the bonding process, the hot liquid captures the carbon and other waste particles, to produce the sludge.

Accordingly, the bonded molecules drop down the branches of the U-shaped tube, eventually reaching a filtration system at the bottom of the U-shaped tube. The misters can be dropped into a vat to be cleaned and reused.

The first and second vacuum tube fans are located at the end of the pollution vacuum tubes. The third fan, called the U-shaped tube fan, is located at the right end of the U-shaped tube. The U-shaped fan is configured to draw the pollution upward into the second U-shaped tube branch and toward a top of the system. The U-shaped tube fan keeps the flow going so the system does not back up. For example, the U-shaped tube fan comprises a multiple-speed fan. For example, the U-shaped tube fan is adjustable depending on one or more of a number of misters and an optimal exhaust speed to promote maximum bonding. The U-shaped tube fan preferably comprises a lighter material since it operates at lower temperatures than do the first vacuum tube fan and the second vacuum tube fan.

One or more of a speed of the U-shaped tube fan and the mixing temperature affects how well the molecules bond together. When the molecules bond, the exhaust molecules becomes heavier and drops into the filtration system. At the bottom of the U-shaped tube, the slurry separates from the hot liquid, which is cooled by a hot liquid cooler. Then the cool liquid enters a cool liquid storage unit where it is pumped up into the water-cooling system again. The cool liquid is recycled for another use.

The U-shaped tube fan preferably comprises rust-free components. This U-shaped tube fan is designed to be quickly replaced using a crane. The system comprises a plurality of sensors located near the U-shaped tube fan. The sensors are preferably configured to detect an amount of exhaust so that the system can promote maximum bonding by adjusting one or more of the fan speed and a mister configuration. The sensors can preferably detect one or more of carbon dioxide, carbon monoxide, hydrocarbons, sulfur dioxide, nitrous oxide, nitrogen dioxide, mercury, and other exhaust particles.

The filtration system is located at the bottom of the U-shaped tube. The purpose of the filtration system is to separate sludge from the hot liquid. The filtration system comprises a fine screen material. For example, the filtration system comprises two layers of screen. For example, the filtration system comprises two layers of screen that are easily replaced. The filter is positioned at a filter angle between approximately 20 degrees and approximately 40 degrees, causing the hot liquid to flow through the filter, while the sludge that is stopped by the filter slides down the filter to a bottom front of the filtration system. The hot liquid is cooled by the hot liquid cooler to capture the exhaust molecules. The cool liquid can then be reused.

The sludge passes to a bottom front of the filtration system, where it can be dropped into the back of a diesel truck or into railroad tankers to be shipped to a factory to make one or more of carbon nanotube (CNT) sheets, fertilizers, and other products.

The filters can easily be changed without having to shut down the power plant.

The carbon capture filtration system captures exhaust pollution generated by the coal-burning smokestack and produces carbon-rich sludge.

FIG. 1 is a drawing of a carbon capture filtration system 100. Included solely for purposes of illustrating a representative scale of the system 100 is a human. The carbon capture filtration system 100 comprises a pollutant vacuum tube assembly 101. The pollutant vacuum tube assembly 101 comprises one or more pollutant vacuum tubes 102, at least one of the one or more pollutant vacuum tubes 102 configured to attach to a smokestack (not shown in FIG. 1; item 210 in FIGS. 2A-2D) of a power plant (not shown in full). Preferably, but not necessarily, the power plant (not shown in full) comprises a coal-fired power plant (not shown in full). Preferably, but not necessarily, the system 100 generates reusable carbon from exhaust of the coal-fired power plant (not shown in full).

Preferably, but not necessarily, and as depicted, the pollutant vacuum tube assembly 101 comprises at least two pollutant vacuum tubes 102A-102B. As depicted, the pollutant vacuum tube assembly 101 comprises exactly two pollutant vacuum tubes 102A-102B, a first pollutant vacuum tube 102A located closer to a top 103 of the system 100, and a second pollutant vacuum tube 102B located closer to a bottom 104 of the system 100. For example, at least one of the one or more pollutant vacuum tubes 102A-102B has a length between approximately twenty feet and approximately forty feet. Preferably, but not necessarily, and as depicted, each of the one or more pollutant vacuum tubes 102A-102B has a length between approximately twenty feet and approximately forty feet. For example, the pollutant vacuum tubes 102A-102B have approximate inner diameters of six feet.

At least one of the one or more pollutant vacuum tubes 102A-102B comprises a respective cutting edge 105A-105B at an end of the respective pollutant vacuum tube 102A-102B adjacent to the smokestack (not shown in FIG. 1; item 210 in FIGS. 2A-2D), the respective cutting edge 105A-105B being configured, as described in more detail in FIGS. 2A-2D, to penetrate the smokestack (not shown in FIG. 1; item 210 in FIGS. 2A-2D). Preferably, but not necessarily, each of the one or more pollutant vacuum tubes 102A-102B comprises a respective cutting edge 105A-105B at an end of the respective pollutant vacuum tube 102A-102B adjacent to the smokestack (not shown in FIG. 1; item 210 in FIGS. 2A-2D), the respective cutting edge 105A-105B being configured, as described in more detail in FIGS. 2A-2D, to penetrate the smokestack (not shown in FIG. 1; item 210 in FIGS. 2A-2D).

At least one of the one or more pollutant vacuum tubes 102A-102B further comprises a respective intake tube 106A-106B, the intake tubes 106A-106B configured to vacuum gaseous pollutants 107 from the smokestack (not shown in FIG. 1; item 210 in FIGS. 2A-2D), the intake tubes 106A-106B further configured to transfer the pollutants 107 in respective directions 108A-108B and 108C-108D away from an end of the respective intake tubes 106A-106B adjacent to the smokestack (not shown in FIG. 1; item 210 in FIGS. 2A-2D) and toward an end of the respective intake tubes 106A-106B that is distal from the smokestack (not shown in FIG. 1; item 210 in FIGS. 2A-2D).

Preferably, but not necessarily, and as depicted, each of the one or more pollutant vacuum tubes 102A-102B comprises a respective intake tube 106A-106B. Preferably, but not necessarily, and as depicted, the first pollutant vacuum tube 102A comprises a first intake tube 106A, the first intake tube 106A configured to vacuum the pollutants 107 from the smokestack (not shown in FIG. 1; item 210 in FIGS. 2A-2D), the first intake tube 106B further configured to transfer the gaseous pollutants 107 in a first direction 108A-108B away from an end of the first intake tube 106A adjacent to the smokestack (not shown in FIG. 1; item 210 in FIGS. 2A-2D) and toward an end of the first intake tube 106A that is distal from the smokestack (not shown in FIG. 1; item 210 in FIGS. 2A-2D). Preferably, but not necessarily, and as depicted, the second pollutant vacuum tube 102B comprises a second intake tube 106B, the second intake tube 106B configured to vacuum the pollutants 107 from the smokestack (not shown in FIG. 1; item 210 in FIGS. 2A-2D), the second intake tube 106B further configured to transfer the pollutants 107 in a second direction 108C-108D away from an end of the second intake tube 106B adjacent to the smokestack (not shown in FIG. 1; item 210 in FIGS. 2A-2D) and toward an end of the second intake tube 106B that is distal from the smokestack (not shown in FIG. 1; item 210 in FIGS. 2A-2D).

As shown below in more detail in FIGS. 2A-2D, one or more of the intake tubes 106A-106B attaches to a side of the smokestack (not shown in FIG. 1; item 210 in FIGS. 2A-2D) using a drill (not shown in FIG. 1; item 205 in FIGS. 2A-2D).

Preferably, but not necessarily, and as depicted, both of the intake tubes 106A-106B attach to a side of the smokestack (not shown in FIG. 1; item 210 in FIGS. 2A-2D) using a respective drill (not shown in FIG. 1; item 205 in FIGS. 2A-2D). As shown below in more detail in FIGS. 2A-2D, the drill (not shown in FIG. 1; item 205 in FIGS. 2A-2D) penetrates a side wall (not shown in FIG. 1; item 205 in FIGS. 2A-2D) of the smokestack (not shown in FIG. 1; item 210 in FIGS. 2A-2D). After penetrating the side wall (not shown in FIG. 1; item 205 in FIGS. 2A-2D) of the smokestack (not shown in FIG. 1; item 210 in FIGS. 2A-2D), the drill (not shown in FIG. 1; item 205 in FIGS. 2A-2D) stays in place to become the respective intake tube 102A-102B. Preferably, but not necessarily, after penetrating the side wall (not shown in FIG. 1; item 205 in FIGS. 2A-2D) of the smokestack (not shown in FIG. 1; item 210 in FIGS. 2A-2D), the respective drill (not shown in FIG. 1; item 205 in FIGS. 2A-2D) stays in place to become the respective intake tube 102A-102B. The power plant does not need to be shut down for the drilling process.

At least one of the one or more pollutant vacuum tubes 102A-102B is configured to receive pollutants 107 emitted from the smokestack (not shown in FIG. 1; item 210 in FIGS. 2A-2D). For example, the pollutants 107 removed from power plant exhaust by the system 100 comprise one or more of carbon dioxide, carbon monoxide, hydrocarbons, sulfur dioxide, nitrous oxide, nitrogen dioxide, and mercury. Preferably, but not necessarily, and as depicted, each of the one or more pollutant vacuum tubes 102A-102B is configured to receive the pollutants 107.

At least one of the pollutant vacuum tubes 102A-102B further comprises a cooling tube 110, the cooling tube 110 configured to receive the pollutants 107 from the respective intake tube 106A-106B, the cooling tubes 110A-110B configured to receive the pollutants 107 from the respective intake tube 106A-106B. Preferably, but not necessarily, and as depicted, each of the pollutant vacuum tubes 102A-102B further comprises a respective cooling tube 110A-110B. Preferably, but not necessarily, at least one of the respective cooling tubes 110A-110B comprises an outer diameter approximately equal to an outer diameter of the respective intake tube 106A-106B. Most preferably, but not necessarily, each of the respective cooling tubes 110A-110B comprises an outer diameter approximately equal to an outer diameter of the respective intake tube 106A-106B. Preferably, but not necessarily, and as depicted, the first pollutant vacuum tube 102A further comprises a first cooling tube 110A, and the second pollutant vacuum tube 102B further comprises a second cooling tube 110B. For example, the cooling tubes 110A-110B have approximate inner diameters of six feet.

Preferably, but not necessarily, and depending among other factors on a quantity of pollutants emitted from the smokestack (not shown in FIG. 1; item 210 in FIGS. 2A-2D), the carbon capture filtration system 100 comprises between one and six cooling tubes 110A-110B. Most preferably, but not necessarily, and as depicted, depending among other factors on the quantity of pollutants 107 emitted from the smokestack (not shown in FIG. 1; item 210 in FIGS. 2A-2D), the carbon capture filtration system 100 comprises between one and six pollutant vacuum tubes 102A-102B per respective cooling tube 110A-110B.

The pollutant vacuum tubes 102A-102B are configured to reduce a temperature of the pollutants 107 emitted from the smokestack (not shown in FIG. 1; item 210 in FIGS. 2A-2D) while delivering the pollutants 107 to the respective cooling tubes 110A-110B.

At least one of the one or more pollutant vacuum tubes 102 is further configured to transmit the pollutants 107 to the respective cooling tube 110A-110B. Preferably, but not necessarily, and as depicted, each of the one or more pollutant vacuum tubes 102 is further configured to transmit the pollutants 107 to the respective cooling tube 110A-110B.

Optionally, at least one of the one or more pollutant vacuum tubes 102A-102B further comprises a respective intake sleeve 112A-112B positioned at an intake tube-cooling tube juncture 113 where the intake tube 106 connects to the respective cooling tube 110A-110B. The intake sleeves 112A-112B fit tightly around the respective pollutant vacuum tube 102A-102B at the respective intake tube-cooling tube juncture 113A-113B, the respective intake sleeve 112A-112B helping to thermally insulate the pollutant vacuum tube 102. Preferably, but not necessarily, and as depicted, each of the one or more pollutant vacuum tubes 102A-102B comprises a respective intake sleeve 112A-112B.

The pollutant vacuum tube 102 further comprises a seal 114 positioned at the intake tube-cooling tube juncture 113. The seal 114 fits tightly around the pollutant vacuum tube 102 at the intake tube-cooling tube juncture 113, the seal 114 helping to chemically seal the pollutant vacuum tube 102. Preferably, but not necessarily, and as depicted, each of the one or more pollutant vacuum tubes 102A-102B comprises a respective seal 114A-114B.

At least one of the one or more cooling tubes 110A-110B a cooler 115, the cooler 115 configured to lower a temperature of the pollutants 107. For example, the cooler 115 is configured to lower the temperature of the pollutants 107 by at least approximately 400 degrees Fahrenheit. For example, the cooler 115 lower the temperature of the pollutants 107 from approximately 650 degrees Fahrenheit to approximately 200 degrees Fahrenheit. The cooler 115 comprises one or more of a liquid-based cooler, a refrigerant-based cooler, and another type of cooler. Preferably, but not necessarily, the cooler 115 comprises wheels, facilitating one or more of cooler removal and cooler replacement. Most preferably, but not necessarily, each of the coolers 115 comprises wheels, facilitating one or more of cooler removal and cooler tube replacement.

Preferably but not necessarily, and as depicted, the first cooling tube 110A comprises six coolers 115A-115F, a first cooler 115A, a second cooler 115B operably connected to the first cooler 115A, a third cooler 115C operably connected to the second cooler 115B, a fourth cooler 115D operably connected to the third cooler 115C, a fifth cooler 115E operably connected to the fourth cooler 115D, and a sixth cooler 115F operably connected to the fifth cooler 115E.

The first cooler 115A is configured to fit snugly inside the first pollutant vacuum tube 102A. The second cooler 115B is configured to fit snugly inside the first pollutant vacuum tube 102A. The third cooler 115C is configured to fit snugly inside the first pollutant vacuum tube 102A. The fourth cooler 115D is configured to fit snugly inside the first pollutant vacuum tube 102A. The fifth cooler 115E is configured to fit snugly inside the first pollutant vacuum tube 102A. The sixth cooler 115D is configured to fit snugly inside the first pollutant vacuum tube 102A.

When the hot pollutants 107 leave the first intake tube 106A, the pollutants 107 enter the first cooling tube 110A and then pass into the first cooler 115A.

Preferably, but not necessarily, and as depicted, the first cooler 115A comprises a liquid-based first cooler 115A. The first cooler 115A comprises one or more pollutant contact tubes 116A-116AP. For example, the first cooler 115A comprises thirty pollutant contact tubes 116A-116E. For example, the liquid used by the liquid-based first cooler 115A comprises one or more of water, non-corrosive cranberry juice, another type of juice, and another fluid. For example, the liquid comprises water, in which case the first cooler 115A comprises a chiller 115A.

From the first cooler 115A, the hot pollutants 107 in this example successively pass into the second cooler 115B, then into the third cooler 115C, then into the fourth cooler 115D, then into the fifth cooler 115E, and then into the sixth cooler 115F. Preferably, but not necessarily, the coolers 115A-115F comprise high-temperature steel.

Preferably, but not necessarily, and as depicted, the second cooler 115B comprises a liquid-based second cooler 115B. The second cooler 115B comprises one or more pollutant contact tubes 116F-116J. For example, the second cooler 115B comprises sixty pollutant contact tubes 116F-116J. Preferably, a number (in this example, that number is thirty) of pollutant contact tubes 116A-116E comprised in the first cooler 115A is less than a number (in this example, that number is sixty) of pollutant contact tubes 116F-116J comprised in the second cooler 115B. The smaller number of pollutant contact tubes 116A-116E comprised in the first cooler 115A relative to the number of pollutant contact tubes 116F-116J comprised in the second cooler 115B allows the pollutant contact tubes 116A-116E comprised in the first cooler 115A to have a larger diameter, thereby allowing liquid to move faster through the first cooler 115A. Preferably, but not necessarily, the first cooler 115A absorbs the most heat of the coolers 115A-115F. For example, the liquid comprises one or more of water, cranberry juice, another type of juice, and another fluid. For example, the liquid comprises water, in which case the second cooler 115B comprises a chiller 115B.

Preferably, but not necessarily, and as depicted, the third cooler 115C comprises a liquid-based third cooler 115C. The third cooler 115C comprises one or more pollutant contact tubes 116K-116P. For example, the third cooler 115C comprises sixty pollutant contact tubes 116K-116P. For example, the liquid comprises one or more of water, cranberry juice, another type of juice, and another fluid. For example, the liquid comprises water, in which case the third cooler 115C comprises a chiller 115C.

The liquid-based coolers 115A, 115B, and 115C are each operably connected via respective cooler-liquid connections 117A, 117B, and 117C that combine to form an integrated cool liquid delivery tube 117 that is operably connected to a cool liquid source as discussed below.

Preferably, but not necessarily, and as depicted, the fourth cooler 115D comprises a refrigerant-based fourth cooler 115D. The fourth cooler 115D comprises one or more pollutant contact tubes 116Q-116Z. For example, the fourth cooler 115D comprises sixty pollutant contact tubes 116Q-116Z. For example, the refrigerant-based fourth cooler 115D uses a refrigerant that comprises one or more of R-407C and carbon dioxide. Refrigerant-based coolers dissipate heat quickly. For example, the refrigerant-based fourth cooler 115D comprises an outer diameter of approximately 5.5 feet. For example, the refrigerant-based fourth cooler 115D comprises a length of approximately 6 feet.

Preferably, but not necessarily, and as depicted, the fifth cooler 115E comprises a refrigerant-based fifth cooler 115E. The fifth cooler 115E comprises one or more pollutant contact tubes 116AA-116AH. For example, the fifth cooler 115E comprises sixty pollutant contact tubes 116AA-116AH. For example, the refrigerant-based fifth cooler 115E uses a refrigerant that comprises one or more of R-407C and carbon dioxide. For example, the refrigerant-based fifth cooler 115E comprises an outer diameter of approximately 5.5 feet. For example, the refrigerant-based fifth cooler 115E comprises a length of approximately 6 feet.

Preferably, but not necessarily, and as depicted, the sixth cooler 115F comprises a refrigerant-based sixth cooler 115F. The sixth cooler 115F comprises one or more pollutant contact tubes 116AI-116AP. For example, the sixth cooler 115F comprises sixty pollutant contact tubes 116AI-116AP. For example, the refrigerant-based sixth cooler 115F uses a refrigerant that comprises one or more of R-407C and carbon dioxide. For example, the refrigerant-based sixth cooler 115F comprises an outer diameter of approximately 5.5 feet. For example, the refrigerant-based sixth cooler 115F comprises a length of approximately 6 feet.

The refrigerant-based coolers 115D, 115E, and 115F are each operably connected via respective cooler-condenser connections 120A-120B, 120C-120D, and 120E-120F to a respective condenser unit 122A, 122B, and 122C. Each of the condenser units 122A-122C comprises a fan coil (not shown) and a pump (not shown). Together, the three condenser units 122A, 122B, and 122C lower the temperature of the pollutant 107 by 200 degrees Fahrenheit.

The system preferably comprises a backup condenser (not shown) usable in case of a failure of one or more of the condenser units 122A-122C. The backup compressor (not shown) is preferably located close to the condenser units 122A-122C.

The liquid-based coolers 115A, 115B, and 115C are each operably connected via respective cooler-hot liquid tube connections 123A, 123B, and 123C to a hot liquid outflow tube 124 configured to conduct outflow of hot liquid 125 from one or more of the liquid-based coolers 115A, 115B, and 115C. Preferably, but not necessarily, the hot liquid outflow tube 124 is configured to conduct outflow of the hot liquid 125 from each of the liquid-based coolers 115A, 115B, and 115C in a hot liquid outflow direction 126. The hot liquid outflow tube 124 is operably connected to a hot liquid storage unit 127 configured to store the hot liquid 125. The hot liquid outflow tube 124 conducts the hot liquid 125 exiting from the liquid based coolers 115A, 115B, and 115C to the hot liquid storage unit 127. The hot liquid storage unit 127 comprises a hot liquid exit portal 128. The hot liquid storage unit 127 is operably connected to a hot liquid pump conduit 129 configured to conduct the hot liquid 125 from the hot liquid storage unit 127 through the hot liquid exit portal 128. As needed, the hot liquid 125 passes from the hot liquid storage unit 127 through the pump conduit 129 in a pump conduit hot liquid direction 130. The hot liquid storage unit 127 optionally further comprises a hot liquid storage unit filter (not shown) configured to filter the hot liquid 125 prior to delivery of the hot liquid 125 to misters, as discussed below.

The pump conduit 129 is operably connected to a hot liquid pump 131 configured to pump the hot liquid 125. From the pump conduit 129, the hot liquid 125 passes on to the hot liquid pump 131. The hot liquid storage unit 127 further comprises a hot liquid delivery tube 133 configured to receive the hot liquid 125 from the cooling tubes 110A-110B. The hot liquid pump 131 is operably connected to the hot liquid delivery tube 133. Preferably, but not necessarily, the hot liquid 125 comprised in the hot delivery tube 133 has a temperature between approximately 120 degrees Fahrenheit and approximately 200 degrees Fahrenheit. Most preferably, but not necessarily, the hot liquid 125 has a temperature of approximately 190 degrees Fahrenheit. A hot liquid temperature of approximately 190 degrees Fahrenheit comprises an optimal temperature at one atmosphere of pressure for mixing the hot liquid 125 with the gaseous pollutant 107. The hot liquid pump 131 pumps the hot liquid 125 through the hot liquid delivery tube 133 and then onward in a hot liquid delivery tube direction 134 to a desired destination.

Preferably but not necessarily, and as depicted, the second cooling tube 110B comprises six coolers 115G-115L, a seventh cooler 115G, an eighth cooler 115H operably connected to the seventh cooler 115G, a ninth cooler 115I operably connected to the eighth cooler 115H, a tenth cooler 115J operably connected to the ninth cooler 115I, an eleventh cooler 115K operably connected to the tenth cooler 115J, and a twelfth cooler 115L operably connected to the eleventh cooler 115K.

The seventh cooler 115G is configured to fit snugly inside the second pollutant vacuum tube 102B. The eighth cooler 115H is configured to fit snugly inside the first pollutant vacuum tube 102B. The ninth cooler 115I is configured to fit snugly inside the second pollutant vacuum tube 102B. The tenth cooler 115J is configured to fit snugly inside the second pollutant vacuum tube 102B. The eleventh cooler 115K is configured to fit snugly inside the second pollutant vacuum tube 102B. The twelfth cooler 115L is configured to fit snugly inside the second pollutant vacuum tube 102B.

When the hot pollutants 107 leave the second intake tube 106B, the pollutants 107 enter the second cooling tube 110B and then pass into the seventh cooler 115G.

Preferably, but not necessarily, and as depicted, the seventh cooler 115G comprises a liquid-based seventh cooler 115G. The seventh cooler 115G comprises one or more pollutant contact tubes 116AQ-116CX. For example, the seventh cooler 115G comprises thirty pollutant contact tubes 116AQ-116AZ. For example, the liquid comprises one or more of water, cranberry juice, another type of juice, and another fluid. For example, the liquid comprises water, in which case the seventh cooler 115G comprises a chiller 115G.

From the seventh cooler 115G, the pollutants 107 in this example successively pass into the eighth cooler 115H, then into the ninth cooler 115I, then into the tenth cooler 115J, then into the eleventh cooler 115K, and then into the twelfth cooler 115L.

Preferably, but not necessarily, and as depicted, the eighth cooler 115H comprises a liquid-based eighth cooler 115H. The eighth cooler 115H comprises one or more pollutant contact tubes 116BA-116BG. For example, the eighth cooler 115H comprises sixty pollutant contact tubes 116BA- 116BG. Preferably, a number (in this example, that number is thirty) of pollutant contact tubes 116AQ-116AZ comprised in the seventh cooler 115G is less than a number (in this example, that number is sixty) of pollutant contact tubes 116BA-116BG comprised in the eighth cooler 115H. The smaller number of pollutant contact tubes 116AQ-116AZ comprised in the seventh cooler 115G relative to the number of pollutant contact tubes 116BA-116BG comprised in the eighth cooler 115H allows the hot pollutants 107 to move faster through the seventh cooler 115G, which is of course the first cooler 115 through which the pollutants 107 pass. For example, the liquid comprises one or more of water, cranberry juice, another type of juice, and another fluid. For example, the liquid comprises water, in which case the eighth cooler 115H comprises a chiller 115H.

Preferably, but not necessarily, and as depicted, the ninth cooler 115I comprises a liquid-based ninth cooler 115I. The ninth cooler 115I comprises one or more pollutant contact tubes 116BH-116BT. For example, the ninth cooler 115I comprises sixty pollutant contact tubes 116BH-116BT. For example, the liquid comprises one or more of water, cranberry juice, another type of juice, and another fluid. For example, the liquid comprises water, in which case the ninth cooler 115I comprises a chiller 115I.

The liquid-based coolers 115G, 115H, and 115I are each operably connected via respective cooler-liquid connections 117D, 117E, and 117F that combine to form an integrated cool liquid delivery tube 117 that is operably connected to a cool liquid source as discussed below.

Preferably, but not necessarily, and as depicted, the tenth cooler 115J comprises a refrigerant-based tenth cooler 115J. The tenth cooler 115J comprises one or more pollutant contact tubes 116BU-116CA. For example, the tenth cooler 115J comprises sixty pollutant contact tubes 116BU-116CA. For example, the refrigerant-based tenth cooler 115J uses a refrigerant that comprises one or more of R-407C and carbon dioxide. Refrigerant-based coolers dissipate heat quickly. For example, the refrigerant-based tenth cooler 115J comprises an outer diameter of approximately 5.5 feet. For example, the refrigerant-based tenth cooler 115J comprises a length of approximately 6 feet.

Preferably, but not necessarily, and as depicted, the eleventh cooler 115K comprises a refrigerant-based eleventh cooler 115K. The eleventh cooler 115K comprises one or more pollutant contact tubes 116CB-116CL. For example, the eleventh cooler 115K comprises sixty pollutant contact tubes 116CB-116CL. For example, the refrigerant-based eleventh cooler 115K uses a refrigerant that comprises one or more of R-407C and carbon dioxide. For example, the refrigerant-based eleventh cooler 115K comprises an outer diameter of approximately 5.5 feet. For example, the refrigerant-based eleventh cooler 115K comprises a length of approximately 6 feet.

Preferably, but not necessarily, and as depicted, the twelfth cooler 115L comprises a refrigerant-based twelfth cooler 115L. The twelfth cooler 115L comprises one or more pollutant contact tubes 116CM-116CX. For example, the twelfth cooler 115L comprises sixty pollutant contact tubes 116CM-116CX. For example, the refrigerant-based twelfth cooler 115L uses a refrigerant that comprises one or more of R-407C and carbon dioxide. For example, the refrigerant-based twelfth cooler 115L comprises an outer diameter of approximately 5.5 feet. For example, the refrigerant-based twelfth cooler 115L comprises a length of approximately 6 feet.

The refrigerant-based coolers 115J, 115K, and 115L are each operably connected via respective cooler-condenser connections 120G-120H, 120I-120J, and 120K-120L to a respective condenser unit 122D, 122E, and 122F. Each of the condenser units 122D-122F comprises a fan coil (not shown) and a pump (not shown). Together, the three condenser units 122D, 122E, and 122F lower the temperature of the pollutant 107 by 200 degrees Fahrenheit.

The refrigerant-based coolers 115J, 115K, and 115L are each operably connected via respective cooler-hot liquid tube connections 123D, 123E, and 123F to the hot liquid outflow tube 124, which is further configured to conduct outflow of the hot liquid 125 from one or more of the liquid-based coolers 115G, 115H, and 115I. Preferably, but not necessarily, the hot liquid outflow tube 124 is further configured to conduct outflow of the hot liquid 125 from each of the liquid-based coolers 115G, 115H, and 115I. The hot liquid outflow tube 124 conducts the hot liquid 125 exiting from the liquid based coolers 115G, 115H, and 115I to the hot liquid storage unit 127.

The carbon capture filtration system 100 further comprises a U-shaped tube 140 that is operably connected to one or more of the pollutant vacuum tubes 102A-102B at respective U-shaped tube-cooling tube junctions 141A-141B. Preferably, but not necessarily, and as depicted, the U-shaped tube 140 comprises a shape generally resembling a letter U. Preferably, but not necessarily, and as depicted, the U-shaped tube 140 is operably connected to the first cooling tube 110A at a first U-shaped tube-cooling tube junction 141A, and the U-shaped tube 140 is operably connected to the second cooling tube 110B at a second U-shaped tube-cooling tube junction 141B.

Preferably, but not necessarily, at least one of the pollutant vacuum tubes 102A-102B slants slightly downward towards the U-shaped tube 140, allowing exhaust particles that drop to the bottom of the respective pollutant vacuum tube 102A-102B to flow by gravity to the U-shaped tube 140. Most preferably, but not necessarily, each of the pollutant vacuum tubes 102A-102B slants slightly downward towards the U-shaped tube 140, allowing exhaust particles that drop to the bottom of the respective pollutant vacuum tube 102A-102B to flow by gravity to the U-shaped tube 140. For example, the pollutant vacuum tubes 102A-102B slant downward at approximately a 5 degree angle.

Alternatively, or additionally, but not necessarily, at least one of the cooling tubes 110A-110B slants slightly downward towards the U-shaped tube 140, allowing exhaust particles that drop to the bottom of the respective cooling tube 110A-110B to flow by gravity to the U-shaped tube 140. Most preferably, but not necessarily, each of the cooling tubes 110A-110B slants slightly downward towards the U-shaped tube 140, allowing exhaust particles that drop to the bottom of the respective cooling tube 110A-110B to flow by gravity to the U-shaped tube 140. For example, the cooling tubes 110A-110B slant downward at approximately a 5 degree angle.

Preferably, but not necessarily, and as depicted, the U-shaped tube 140 comprises at least one U-shaped tube branch 142A-142B. Most preferably, but not necessarily, and as depicted, the U-shaped tube 140 comprises both a first U-shaped tube branch 142A and a second U-shaped tube branch 142B. (As noted below, embodiments of the invention can work using a U-shaped tube 142 that comprises only one U-shaped tube branch 142A/142B and thus comprises a single vertical column.) Preferably, but not necessarily, and as depicted, at least one U-shaped tube branch 142A-142B is operably connected to a respective first intake tube end of the respective cooling tube 110A-110B. Most preferably, but not necessarily, and as depicted, the first U-shaped tube branch 142A is operably connected to the first pollutant vacuum tube 102A at a first U-shaped tube-cooling tube junction 141A, and the first U-shaped tube branch 142A is operably connected to the second pollutant vacuum tube 102B at a second U-shaped tube-cooling tube junction 141B. Preferably, but not necessarily, and as depicted, the second U-shaped tube branch 142B is distal from one or more of the first U-shaped tube-cooling tube junction 141A and the second U-shaped tube-cooling tube junction 141B. Most preferably, but not necessarily, and as depicted, the second U-shaped tube branch 142B is distal from both the first U-shaped tube-cooling tube junction 141A and the second U-shaped tube-cooling tube junction 141B.

The first U-shaped tube branch 142A is operably connected to a first intake tube end immediately adjacent to the pollutant vacuum tube assembly 101. A number of pollutant vacuum tubes 102A-102B per respective U-shaped tube 140 does not necessarily need to be the same for all U-shaped tubes 140. For example, a first U-shaped tube 140 can be operably connected to three pollutant vacuum tubes 102, a second U-shaped tube 140 can be operably connected to one pollutant vacuum tube 102, and a third U-shaped tube 140 can be operably connected to six pollutant vacuum tubes 102.

At least one of the pollutant vacuum tube 102A-102B further comprises a respective pollutant vacuum tube fan 143A-143B, the pollutant vacuum tube fan 143A-143B configured to vacuum the pollutant 107 from the smokestack (not shown in FIG. 1; item 210 in FIGS. 2A-2D), the fan 143A-143B further configured to pump the pollutant 107 from the respective pollutant vacuum tube 102A-102B, past the respective U-shaped tube-cooling tube junction 141A-141B, and into the U-shaped tube 140. For example, at least one of the pollutant vacuum tube fans 143A-143B comprises a multi-speed vacuum pollutant vacuum tube fan 143A-143B. Preferably, but not necessarily, both of the pollutant vacuum tube fans 143A-143B comprises a multi-speed pollutant vacuum tube fan 143A-143B. For example, one or more of the pollutant vacuum tube fans 143A-143B has three different speeds. Preferably, but not necessarily, and as depicted, the first pollutant vacuum tube fan 143A is configured to vacuum the pollutant 107 from the smokestack (not shown in FIG. 1; item 210 in FIGS. 2A-2D), the first pollutant vacuum tube fan 143A further configured to pump the pollutant 107 from the first pollutant vacuum tube 102A, past the first U-shaped tube-cooling tube junction 141A, and into the U-shaped tube 140. Preferably, but not necessarily, the first pollutant vacuum tube fan 143A delivers the pollutant 107 into the U-shaped tube 140 under pressure.

Preferably, but not necessarily, and as depicted, the second pollutant vacuum tube fan 143B is configured to vacuum the pollutant 107 from the smokestack (not shown in FIG. 1; item 210 in FIGS. 2A-2D), the second pollutant vacuum tube fan 143B further configured to pump the pollutant 107 from the second pollutant vacuum tube 102B, past the second U-shaped tube-cooling tube junction 141B, and into the U-shaped tube 140. Preferably, but not necessarily, the second pollutant vacuum tube fan 143B delivers the pollutant 107 into the U-shaped tube 140 under pressure.

At least one of the pollutant vacuum tube fans 143A-143B is operably connected to a respective drive shaft 144A-144B, the respective drive shaft 144A-144B configured to move the respective pollutant vacuum tube fan 143A-143B if the respective drive shaft 144A-144B is moved. Preferably, but not necessarily, and as depicted, the first pollutant vacuum tube fan 143A is operably connected to a first drive shaft 144A, the first drive shaft 144A configured to move the first pollutant vacuum tube fan 143A if the first drive shaft 144A is moved. Preferably, but not necessarily, and as depicted, the second pollutant vacuum tube fan 143B is operably connected to a second drive shaft 144B, the second drive shaft 144B configured to move the second pollutant vacuum tube fan 143B if the second drive shaft 144B is moved.

At least one of the drive shafts 144A-144B is operably connected to a respective fan pump 145A-145B, the respective fan pump 145A-145B configured to drive the respective pollutant vacuum tube fan 143A-143B by driving the respective drive shaft 144A-144B, thereby moving the pollutant 107 in a respective direction 146A-146B from the respective pollutant vacuum tube 102A-102B, through the respective U-Shaped tube-cooling tube junction 141A-141B, and into the U-shaped tube 140. Preferably, but not necessarily, and as depicted, at least one of the fan pumps 145A-145B is located outside of the respective cooling tube 110A-110B so as not to be exposed to the pollutants 107.

Preferably, but not necessarily, and as depicted, the first drive shaft 144A is operably connected to the first fan pump 145A, the first fan pump 145A configured to drive the first pollutant vacuum tube fan 143A by driving the first drive shaft 144A, thereby moving the pollutant 107 in a first direction 146A from the first pollutant vacuum tube 102A, through the first U-Shaped tube-cooling tube junction 141A, and into the U-shaped tube 140. Preferably, but not necessarily, and as depicted, the second drive shaft 144B is operably connected to the second fan pump 145B, the second fan pump 145B configured to drive the second pollutant vacuum tube fan 143B by driving the second drive shaft 144B, thereby moving the pollutant 107 in a second direction 146B from the second pollutant vacuum tube 102B, through the second U-Shaped tube-cooling tube junction 141B, and into the U-shaped tube 140.

One or more of the cooling tubes 110A-110B comprises a respective adapter plate 147A-147B, the respective adapter plate 147A-147B configured to house the respective pollutant vacuum tube fan 143A-143B. Preferably, but not necessarily, the first cooling tube 110A comprises a first adapter plate 147A, the first adapter plate 147A configured to house the first pollutant vacuum tube fan 143A. Preferably, but not necessarily, the second cooling tube 110B comprises a second adapter plate 147B, the second adapter plate 147B configured to house the second pollutant vacuum tube fan 143B.

Preferably, but not necessarily, the respective adapter plates 147A-147B are configured to be unbolted to allow the respective cooling tube 110A-110B to be one or more of removed for maintenance and replaced.

Preferably, but not necessarily, one or more of the adapter plates 147A-147B comprises a half-pipe with a cross-section of approximately 182 degrees. Preferably, but not necessarily, both of the adapter plates 147A-147B comprise respective half-pipes, each with a cross-section of approximately 182 degrees. The adapter plates 147A-147B do one or more of bolt together and fasten together. Alternatively, or additionally, one or more of the adapter plates 147A-147B bolts to the U-shaped tube 140. Preferably, but not necessarily, both of the adapter plates 147A-147B bolt to the U-shaped tube 140. For example, the adapter plates 147A-147B bolt together using a locking system that is one or more of easy to remove and easy to replace.

The first U-shaped tube branch 142A comprises first misters 155A, the first misters 155A configured to emit a hot first mist 156A configured to cause molecules of the exhaust 107 to bond. A typical first mister 155A emits the first mist 156A so as to extend outward from the emitting first mister 155A by a distance between approximately 9 inches and approximately 24 inches, creating a wall of the first mist 156A configured to mix with the cooled pollutant 107, bonding the two together.

The second U-shaped tube branch 142B comprises second misters 155B, the second misters 155B configured to emit a hot second mist 156B configured to cause the molecules of the exhaust 107 to bond. A typical second mister 155B emits the second mist 156B so as to extend outward from the emitting second mister 155B by a distance between approximately 9 inches and approximately 24 inches, creating a wall of the second mist 156B configured to mix with the cooled pollutant 107, bonding the two together.

The hot liquid pump 131 pumps the hot liquid 125 through the hot liquid delivery tube 133 and then onward in the hot liquid delivery tube direction 134 to the desired destination of one or more of the first U-shaped tube branch 142A and the second U-shaped tube branch 142B. Preferably, but not necessarily, the hot liquid 125 comprised in the hot delivery tube 133 has a temperature between approximately 120 degrees Fahrenheit and approximately 200 degrees Fahrenheit. Most preferably, but not necessarily, the hot liquid 125 has a temperature of approximately 190 degrees Fahrenheit. A hot liquid temperature of approximately 190 degrees Fahrenheit comprises an optimal temperature at one atmosphere of pressure for mixing the hot liquid 125 with the gaseous pollutant 107. Preferably, but not necessarily, and as depicted, the hot liquid delivery tube 133 comprises a first hot liquid delivery tube branch 133A configured to deliver the hot liquid 125 in a first hot liquid delivery tube direction 134A to the first misters 155A and a second hot liquid delivery tube branch 133B configured to deliver the hot liquid 125 in a second hot liquid delivery tube direction 134B to the second misters 155B.

The first hot mist 156A has a temperature of between approximately 182 degrees Fahrenheit and approximately 200 degrees Fahrenheit. Preferably, but not necessarily, the first mist 156A has an approximate temperature of 190 degrees Fahrenheit, which comprises an optimal temperature at one atmosphere of pressure for mixing the first hot mist 156A with the gaseous pollutant 107.

The first hot liquid delivery tube branch 133A delivers the hot liquid 125 to the first misters 155A through a first hot liquid U-tube delivery hole 157A at a top of the left U-tube branch 142A. The second hot liquid delivery tube branch 133B delivers the hot liquid 125 to the first misters 155A through a first hot liquid U-tube delivery hole 157A at a top of the left U-tube branch 142A.

A number of first misters 155A can be selected based among other variables on an amount of pollutant 107 being emitted by the smokestack (not shown in FIG. 1; item 210 in FIGS. 2A-2D). The first misters 155A are arranged in one or more first mister rows 158A-158B. FIG. 1 depicts first misters 155A comprising two vertical first mister rows 158A-158B of individual misters, the first mister rows 158A and 158B connected at a first mister bottom point 159A of the first mister rows 158A-158B. Preferably, but not necessarily, the first misters 155A typically comprise approximately six first mister rows 158A-158B. A representative height 160A of a first mister row 158A-158B comprises between approximately 30 feet and approximately 50 feet. A representative first mister separation 161A between adjacent first misters 155A comprises between approximately 3 inches and approximately 6 inches. A representative number of first misters 155A in each of the first mister rows 158A-158B is between approximately six and approximately twelve. A representative first mister diameter 162A spanning outermost first mister rows 158A and 158B is between approximately four feet and approximately seven feet. Preferably, but not necessarily, a representative first mister diameter 162A is approximately 5½ ft.

After passing into the U-shaped tube 140 through the one or more of the first U-shaped tube-cooling tube junction 141A and the second U-shaped tube-cooling tube junction 141B, the pollutant 107 contacts the first misters 155A.

The pollutant 107 then bonds with the first mist 156A emitted by the first misters 155A, the first mist 156A now having approximately a same temperature as the pollutant 107, the first mist 156A effectively bonding with the pollutant 107, thereby mixing carbon dioxide in the pollutant 107 with the first mist 156A comprising water, forming a first slurry 163A. Following bonding, the first slurry 163A then is weighed down and accordingly, the first slurry 163A falls downward in a first pollutant downward direction 164A in the first U-shaped tube branch 142A, dropping to a U-shaped tube bottom 165.

The second U-shaped tube branch 142B further comprises a U-shaped tube fan 166, the U-shaped tube fan 166 configured to draw the pollutant 107 in an upward direction 167 toward a U-shaped tube second branch top 164 of the second U-shaped tube branch 142B located at the top 103 of the system 100. Preferably, but not necessarily, the U-shaped tube fan comprises a multi-speed U-shaped tube fan 166. The system 100 controls the bonding by varying one or more of a speed of the U-shaped tube fan 166 and the mixing temperature. The U-shaped tube fan 166 preferably comprises a sensor (not shown) usable to detect a presence of one or more pollutants (for example, one or more of carbon dioxide, carbon monoxide, hydrocarbons, sulfur dioxide, nitrous oxide, nitrogen dioxide, mercury, and other exhaust particles), the sensor (not shown) further configured to adjust a speed of the U-shaped tube fan 166 accordingly. The U-shaped tube fan facilitates flow of the pollutant 107 so that the system 100 does not back up. A portion of the pollutant 107 then moves in the upward direction 167 and exits the U-shaped tube 140 through an exhaust exit port 168 located at the U-shaped tube second branch top 164. After passing into the U-shaped tube 140 through the one or more of the first U-shaped tube-cooling tube junction 141A and the second U-shaped tube-cooling tube junction 141B, then travelling down the first U-tube branch 142A, and travelling up the second U-shaped tube branch 142B to the U-shaped tube second branch top 164, the pollutant 107 contacts the second misters 155B. A quantity of the pollutant 107 that enters the second U-shaped tube branch 142B was found to be approximately 25 percent of the amount of pollutant 107 that enters the first U-shaped tube branch 142A and mixes with the first misters 156A.

The U-shaped tube fan 166 preferably comprises a lighter material than that comprised in the pollutant vacuum tube fans 143A-143B since the U-shaped tube fan 166 operates at lower temperatures relative to the pollutant vacuum tube fans 143A-143B. For example, a speed of the U-shaped tube fan 166 is adjustable depending on one or more of a number of first misters 155A, a number of second misters 155B, and an optimal exhaust speed to promote maximum molecular bonding. One or more of the speed of the U-shaped tube fan 166 and the mixing temperature affects how well the slurry 163A-163B bonds together. Preferably, but not necessarily, the U-shaped tube fan 166 is removable when changing the second misters 155B. The first misters 155A are easily removable without a need to remove the U-shaped tube fan 166.

The slurry 163A-163B then bonds with the second mist 156B emitted by the second misters 155B, the second mist 156B now having approximately a same temperature as the pollutant 107, the second mist 156B effectively bonding with the pollutant 107, thereby mixing carbon dioxide in the pollutant 107 with the second mist 156B comprising water, forming a second slurry 163B. Relative to the first slurry 163A formed after contacting the first misters 155A, the second slurry 163B will have cooled prior to contacting the second misters 155B.

Following bonding, the second slurry 163B then is weighed down and accordingly, the second slurry 163B falls downward in the second pollutant downward direction 164B in the second U-shaped tube branch 142B, dropping to the U-shaped tube bottom 165. It was found that between approximately 95 percent and approximately 98 percent of the slurry 163A-163B bond with the second mist 156B, so that only between approximately 2 percent and approximately 5 percent of the slurry 163A-163B merges through the exhaust exist port 168. After dropping in one or more of the first pollutant downward direction 164A and the second pollutant downward direction 164B, the slurry 163A-163B, still comprising some hot liquid 125, falls until it reaches the slurry processing assembly 169.

The U-shaped tube 140 further comprises a slurry processing assembly 169 located at the U-shaped tube bottom 165, the slurry processing assembly 169 configured to filter the slurry 163A-163B. The slurry processing assembly 169 comprises a filter 170, filter 170 configured to separate out the slurry 163A-163B into one or more of a solid sludge 171 and the hot liquid 125. Preferably, but not necessarily, the filter 170 is configured to separate out the slurry 163A-163B into both the solid sludge 171 and the hot liquid 125.

The slurry processing unit further comprises a hot liquid cooler 172 configured to cool the hot liquid 125, creating the cool liquid 174. The hot liquid cooler comprises one or more of a liquid-based hot liquid cooler 172 and a refrigerant-based hot liquid cooler 172. Preferably, but not necessarily, and as depicted, the hot liquid cooler 172 comprises a refrigerant-based hot liquid cooler 172. The refrigerant-based hot liquid cooler 172 is operably connected to a hot liquid condenser 173. The hot liquid condenser 173 comprises a fan coil (not shown) and a pump (not shown).

Preferably but not necessarily, the filter 170 comprises a fine screen material. Preferably but not necessarily, the filter 170 comprises a fine screen material configured to remove a minimum of 997 parts out of a thousand. After contacting the filter 170, a solid sludge 171 is blocked from falling further while the hot liquid 125 is separated from the slurry 163A-163B and passes through the filter 170. The hot liquid 125 is cooled by the hot liquid cooler 172, creating cool liquid 174. The sludge 171 can then be prepared for one or more of transport, recycling, and reuse. The cool liquid 174 can then be reused.

Preferably, but not necessarily, the filter 170 is positioned at a filter angle 170A relative to the ground. The filter angle 170A causes the hot liquid 125 to flow through the filter 170, while the solid sludge 171 that is stopped by the filter slides down the filter to a bottom front of the slurry processing assembly 169. Preferably, and as depicted, but not necessarily, the filter angle 170A comprises a non-zero filter angle 170A. Preferably, but not necessarily, the filter angle 170A comprises between approximate 20 degrees and approximately 40 degrees.

As described below, the system 100 reuses the cool liquid 174 to supply the cool liquid 174 to the liquid-based coolers 115A-115C and 115G-115I. The U-shaped tube 140 further comprises a cool liquid exit portal 175 configured to allow the cool liquid 174 separated out by the filter 170 from the solid sludge 171 to flow through the cool liquid exit portal 175 and into a cool liquid flow pipe 176. The cool liquid 174 flows through the liquid transport pipe 176 in a first cool liquid flow direction 177A to a cool liquid transport pipe junction 178. From the cool liquid transport pipe junction 178, the cool liquid 174 flows in the first liquid flow direction 177A through a first cool liquid storage unit portal 179A into a cool liquid storage unit 180 configured to store the cool liquid 174. Alternatively, or additionally, from the cool liquid transport pipe junction 178, the cool liquid flows in a second cool liquid flow direction 177B through a second cool liquid storage unit portal 179B into the cool liquid storage unit 180.

The cool liquid storage unit 180 comprises the cool liquid delivery tube 117. The cool liquid storage unit 180 is operably connected to one or more of the hot liquid cooler 172 and the hot liquid condenser 173. Preferably, but not necessarily, and as depicted, the cool liquid storage unit 180 is operably connected to both the hot liquid cooler 172 and the hot liquid condenser 173. The cool liquid storage unit 180 further comprises one or more of the hot liquid cooler 172 and the hot liquid condenser 173. Preferably, but not necessarily, and as depicted, the cool liquid storage unit 180 further comprises both the hot liquid cooler 172 and the hot liquid condenser 173. The cool liquid storage unit 180 further comprises a cool liquid exit portal 181. The cool liquid storage unit 180 further comprises a cool liquid pump conduit 182 configured to conduct the cool liquid 174 exiting from the cool liquid storage unit 180 through the cool liquid exit portal 181. The cool liquid storage unit 180 is operably connected via the cool liquid pump conduit 182 to a cool liquid pump 183 configured to pump the cool liquid 174 from the cool liquid storage unit 180 in a cool liquid delivery tube direction 184 via the cool liquid delivery tube 117 to one or more of the liquid-based coolers 115A-115C and 115G-115I. Preferably, but not necessarily, and as depicted, the cool liquid pump 183 is configured to pump the cool liquid 174 from the cool liquid storage unit 180 via the cool liquid delivery tube 117 to each of the liquid based coolers 115A-115C and 115G-115I. A representative temperature of the cool liquid 174 in the cool liquid delivery tube 117 is approximately ambient temperature. If a temperature of the cool liquid 174 drops below approximately 50 degrees, a cool liquid heater (not shown) may be used to heat the cool liquid 174. If the temperature of the cool liquid 174 climbs above approximate 80 degrees, a cool liquid cooler (not shown) may be used to cool the cool liquid 174. The cool liquid pump 183 pumps the cool liquid 174 through the cool liquid delivery tube 117 and then onward in the cool liquid delivery tube direction 184 to a desired destination to one or more of the liquid-based coolers 115A-115C and 115G-115I. Preferably, but not necessarily, and as depicted, the cool liquid pump 183 pumps the cool liquid 174 through the cool liquid delivery tube 117 and then onward in the cool liquid delivery tube direction 184 to a desired destination to each of the liquid-based coolers 115A-115C and 115G-115I.

The filter angle 170A of the filter 170 causes the solid sludge 171 to slide toward a front portion 185 of the filter 170. Preferably, and as depicted, but not necessarily, the filter angle 170A comprises a non-zero filter angle 170A. After reaching the front portion 185 of the filter 170, the solid sludge 171 passes into a funnel 186 that guides the solid slurry 163A-163B into a sludge exit tube 187, the sludge exit tube 187 configured to guide the slurry 163A-163B downward. As depicted, the slurry processing assembly 163A-163B further comprises a sludge bin 190, the sludge bin 190 configured to hold the slurry 163A-163B. As depicted, the sludge bin 190 comprises a sludge bin floor 191 configured to support the slurry 163A-163B. As depicted, the sludge bin 190 further comprises a sludge gate 192 configured to open the sludge bin floor 191 when desired so as to allow the slurry 163A-163B to drop through the sludge bin floor 191 due to gravity. As depicted, the open sludge gate 192 can drop the slurry 163A-163B through the open sludge bin floor 192 into a properly positioned transportation device 195. As depicted, the transportation device 195 comprises a wheeled cart 195. Alternatively, or additionally, the transportation device 195 comprises one or more of a train an automobile, a truck, and virtually any other desired form of ground transportation, including ground transportation intended to transport the sludge 171 to an airplane or helicopter for rapid transportation of the sludge 171 to a desired destination.

Processing of the slurry 163A-163B may comprise running a small electrical charge across the slurry 163A-163B, thereby freeing the oxygen, thereby increasing the weight of the sludge, rendering it usable in one or more of CNT and other products. Alternatively, or additionally, the processing of the slurry 163A-163B may comprise separating out carbon dioxide using sediment filtration for use by farmers and for other uses.

FIGS. 2A-2D are a set of diagrams illustrating a carbon capture filtration method 200.

The order of the steps in the method is not constrained to that shown in FIGS. 2A-2D or described in the following discussion. Several of the steps could occur in a different order without affecting the final result. Included solely for purposes of illustrating a representative scale is a human.

Figure 2A:
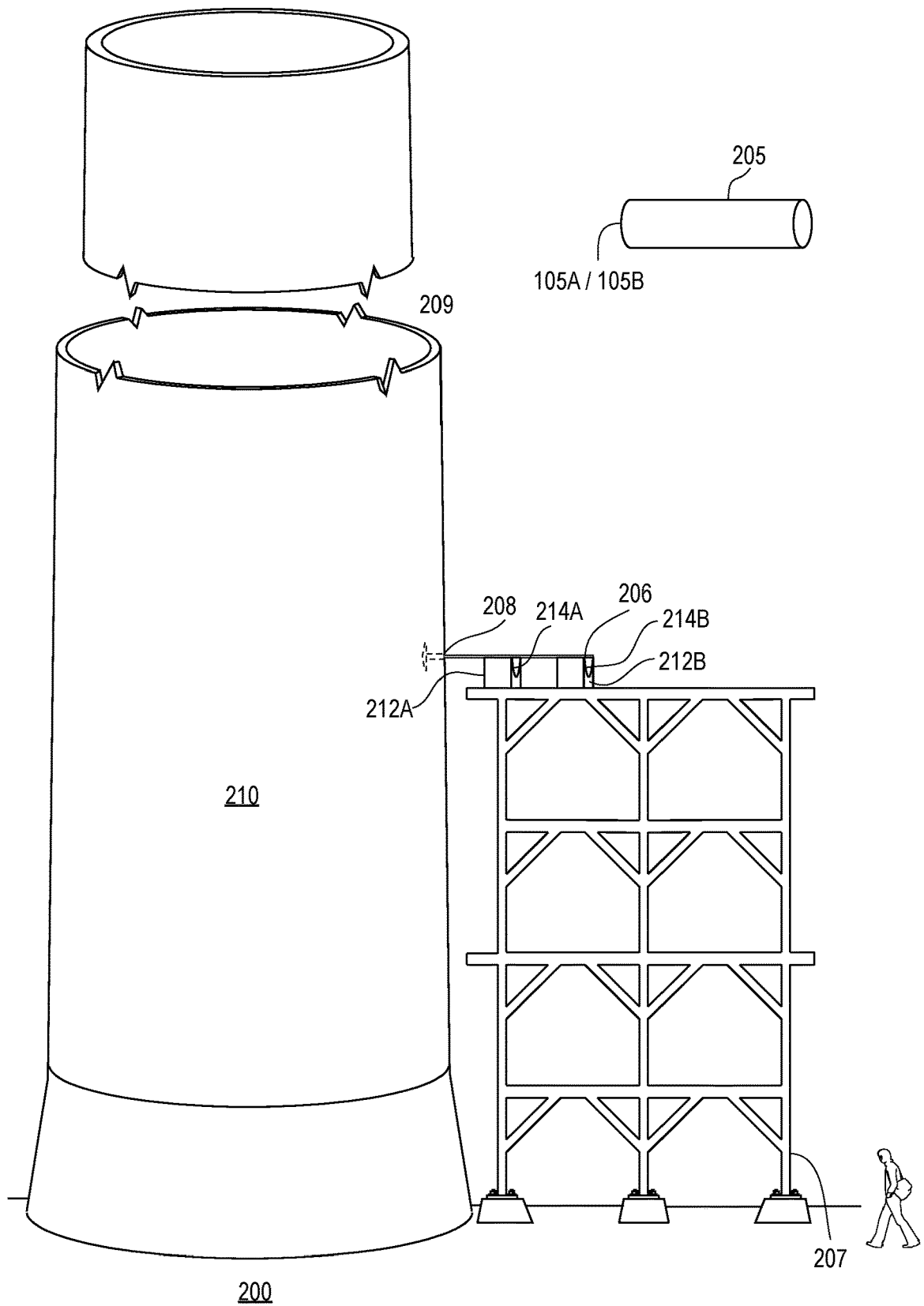
FIGS. 2A-2D are a set of diagrams illustrating steps in a carbon capture filtration method.

FIG. 2A depicts a first step 200 in the method in which a drill 205 comprising the cutting edge 105A/105B is prepared in readiness for use in later steps. A small drill 206 is placed on a scaffold 207 and is used to drill a small hole 208 in a side wall 209 of a smokestack 210 of a power plant (not shown). For example, the small hole 208 has a diameter of approximately 6 inches. Alternatively, or additionally, a crane (not shown) and a helicopter (not shown) can be used to lift the one or more of the small drill to a proper location for drilling the small hole 208. The small drill 206 is supported during the drilling by hemispherical supports 212A and 212B. The hemispherical supports 212A and 212B comprise drill bearings 214A and 214B. For example, the drill bearing 214A-214B comprise hemispherical drill bearings 214A-214B. Alternatively, or additionally, a worker can simply drill the small hole 208 using the small drill 206 without a need for the hemispherical supports 212A and 212B and without a need for the drill bearings 214A and 214B. Once the small hole 208 is drilled, the small drill 206 is removed and stored in a tool shed (not shown).

Figure 2B:
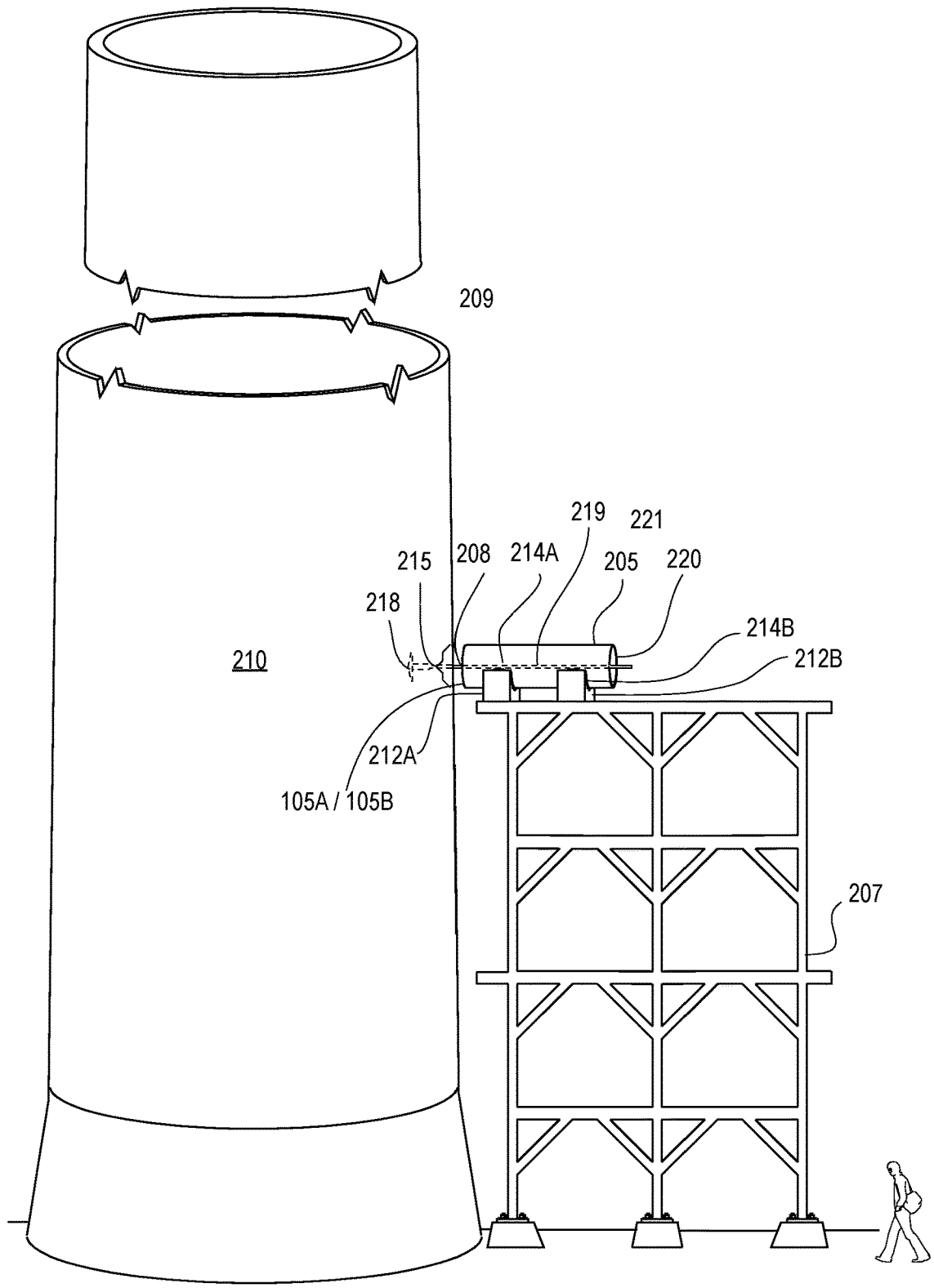

FIG. 2B depicts a second step 216 in the method in which the drill 205 comprising the cutting edge 105A/105B is positioned on the hemispherical supports 212A-212B comprising the bearings 214A-214B, which are positioned on the scaffold 207 in preparation for enlarging the small hole 208 by drilling a large hole (not shown in FIG. 2B; item 230 in FIGS. 2C-2D) in the side wall 209 of the smokestack 210. For example, the drill 205 comprises a drill diameter 215 between approximately four feet and approximately six feet.

The drill 205 comprises a molly 218 that is operably connected by a threaded rod 219, using a large nut (not shown) to an end cap 220 at a back end of the drill 205 from the molly 218. Once the molly 218 is pushed through the small hole 208 and spreads its wings, the molly 218 locks in place inside the side wall 209. In preparation for drilling, the molly 218 is inserted using the threaded rod 219 through the small hole 208 and into the smokestack 210, thereby providing leverage for the planned drilling by the drill 205. The molly 218 is configured to help the drill 205 to penetrate the side wall 209 of the smokestack and thereby facilitate the drill's entrance into the smokestack.

Figure 2C:
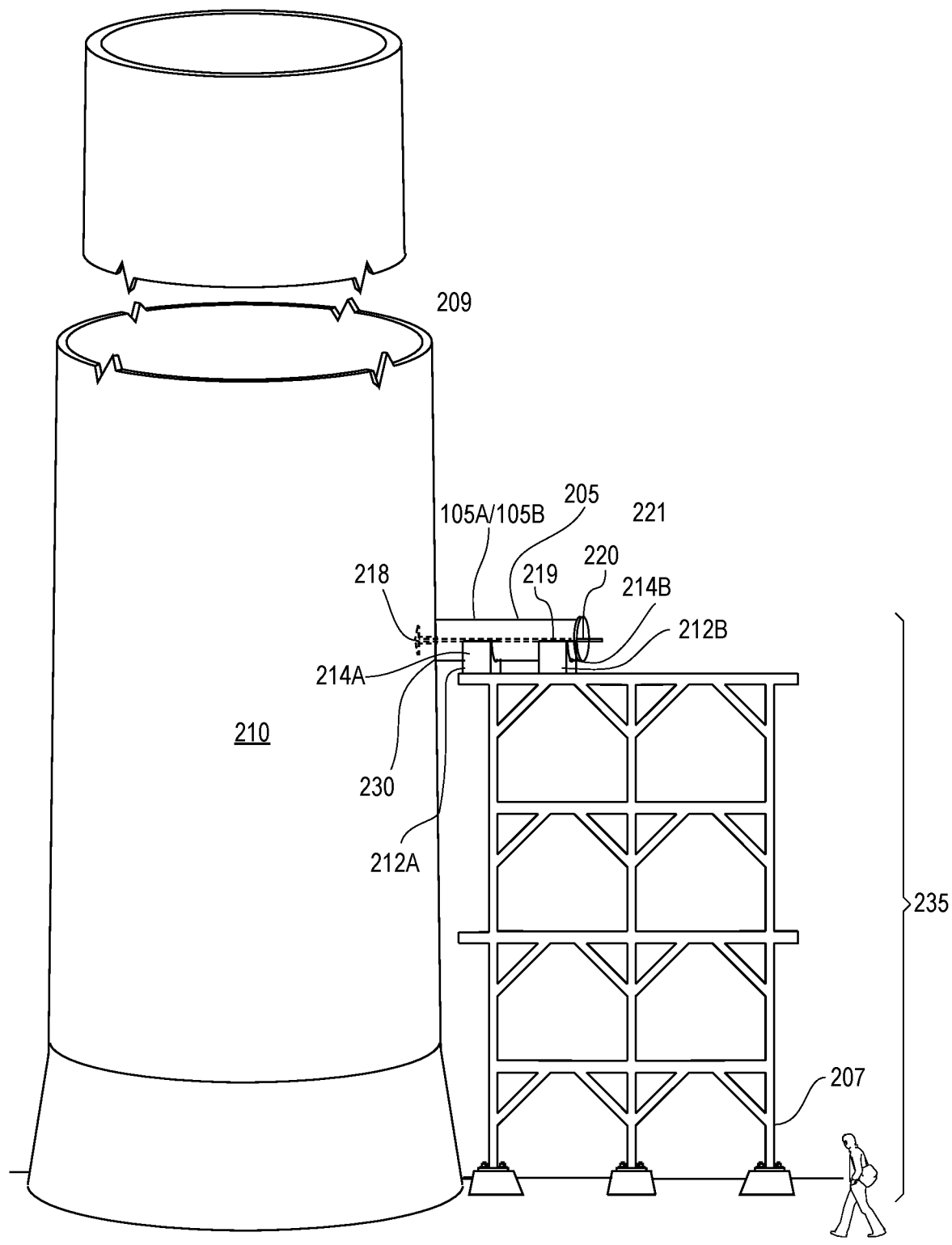

FIG. 2C depicts a third step 225 in the method. The drill 205 again comprises the cutting edge 105/105B, which is configured to penetrate the side wall 209 of the smokestack 210. For example, the drill 205 comprises one or more of an oscillating drill and a reciprocating drill. For example, the drill 205 comprises stainless steel so as to survive the high heat and corrosive pollutants being expelled from the smokestack 210. The power plant does not need to be shut down for the drilling process. For example, the drill 205 comprises a generally tubular shape. For example, the drill 205 comprises a drill length of between approximately ten feet and approximately thirty feet. The cutting edge 105A/105B comprises one or more of grinding stone, tungsten carbide, and diamond.

The drill 205 drills a large hole 230 that enlarges the small hole (not shown in this figure; item 208 in FIGS. 2A-2B). The drill 205 drills the large hole 230 while again positioned on the hemispherical supports 212A-212B comprising the bearings 214A-214B, which are again positioned on the scaffold 207.

The drill 205 is guided and pulled by the molly 218, which is again operably connected by the threaded rod 219 to the end cap 220 at the back end 221 of the drill 205. The pulling by the molly 218 enables the cutting edge 105A/105B to work its way through the smokestack 210. The end cap 220 comprises a bearing that rides against a back of the drill 205. The end cap with the threaded rod through the center is attached by a large nut that when tightened uses the molly as an anchor, giving leverage to pull the oscillating drill into the side of the smokestack.

The drill incrementally penetrates the side wall 209 of the smokestack 210. During the drilling, the molly 218 penetrates inside the sidewall 209 of the smokestack 210.

The drill 205 is configured to cut through one or more of concrete and rebar. The drill 205 offers a reduced level of vibration. Representative dimensions of the drill 205 can comprise an approximate outer diameter of 6 feet and 3 inches and an approximate inner diameter of 6 feet and 1 inch. In embodiments in which the drill 205 serves after drilling as an intake sleeve (not shown in this figure; item 112A-112B in FIG. 1), representative dimensions of the intake tube (not shown in this figure; item 110A-110B in FIG. 1) can comprise an approximate outer diameter of 6 feet and an approximate inner diameter of 5 feet and 11 inches.

The drill 205 use a lubricant configured to function as a sealant after the drilling has been completed. The drill 205 can be made of stainless steel or other metal products that are capable of withstanding the heat of the smokestack, weight of the sidewall, and corrosive pollution.

The drill 205 enters the side wall 209 of the smokestack, where it stays in place to become the intake tube (not shown in this figure; item 110A-110B in FIG. 1), or in alternative embodiments to become the intake sleeve (not shown in this figure; item 112A-112B in FIG. 1).

Preferably, but not necessarily, the large hole 230 is drilled at a location having a height of between approximately 20% and approximately 60% of the full height of the smokestack 210, thereby maximizing an amount of carbon that can be captured by embodiments of the invention. For example, a representative height 235 above the ground of the drill 205 is between approximately 40 feet and approximately 60. The drill 205 may be powered by one or more of a chain and a belt, the one or more of a chain and a belt configured to rock the drill 205 back and forth while the drill 205 works its way through the side wall 209 of the smokestack 210.

Alternatively, or additionally, one or more of a crane (not shown) and a helicopter (not shown) can be used to lift the drill 205 to a proper location for drilling the large hole 230.

Figure 2D:
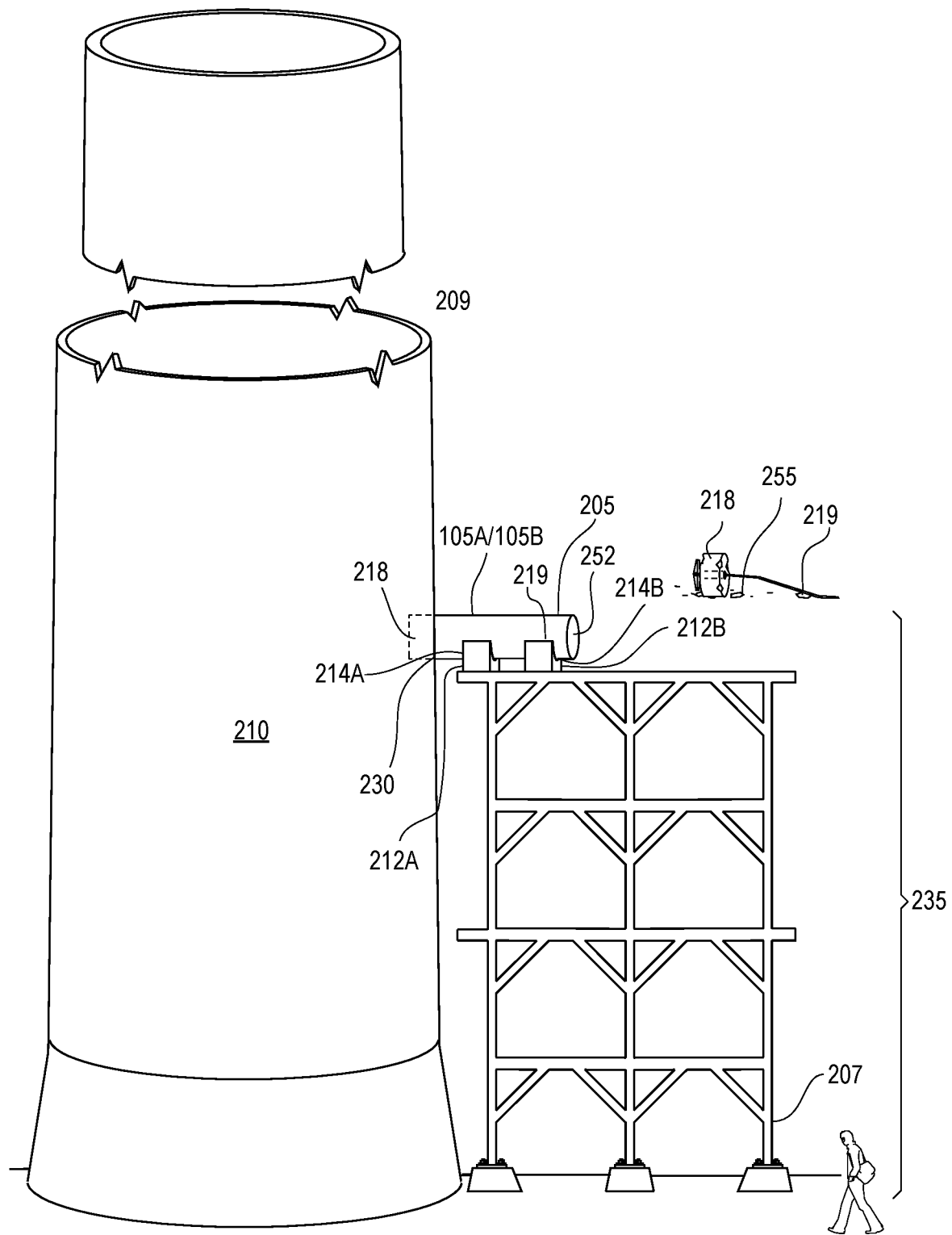

FIG. 2D depicts a fourth step 250 in the method. The drill 205 is again positioned on the hemispherical supports 212A-212B comprising the bearings 214A-214B, which are again positioned on the scaffold 207.

Once the drill 205, positioned at a height 235 on the scaffold 207, has drilled the large hole 230 in the side wall 209 of the smokestack 210 by the drill 205, the molly 218 is extracted through a drill center 252 of the drill 205 along with the threaded rod 219 and surplus concrete 255 generated by the drilling. The molly 218 and the surplus concrete 255 can be discarded. The end cap 220 can be separated from the threaded rod 219 and reused for another job. According to further embodiments of the invention, the drill 205 is left in place without compromising the smokestack 210 and thereafter functions as an intake tube (not shown in this figure; item 110A-110B in FIG. 1). Alternatively, or additionally, following the completion of the drilling of the large hole 230, the drill 205 becomes an intake sleeve (not shown in this figure; item 112A-112B in FIG. 1) that has a drill inner diameter that is slightly larger than an outer diameter of an intake tube (not shown in this figure; item 110A-110B in FIG. 1). In these embodiments, the intake tube (not shown in this figure; item 110A-110B in FIG. 1) is inserted inside the intake sleeve (not shown in this figure; item 112A-112B in FIG. 1) formed by the drill 205.

As the drill 206 penetrates the side wall 209 of the smokestack 210 by an oscillation process, the nut (not shown) is tightened slowly. The tightening of the nut (not shown) puts pressure on the drill 205 and provides leverage for the drilling. When the drilling is completed, the leverage helps pull through the drill 205 one or more of the molly 218, the threaded rod 219, and the surplus concrete 255.

Figure 3:
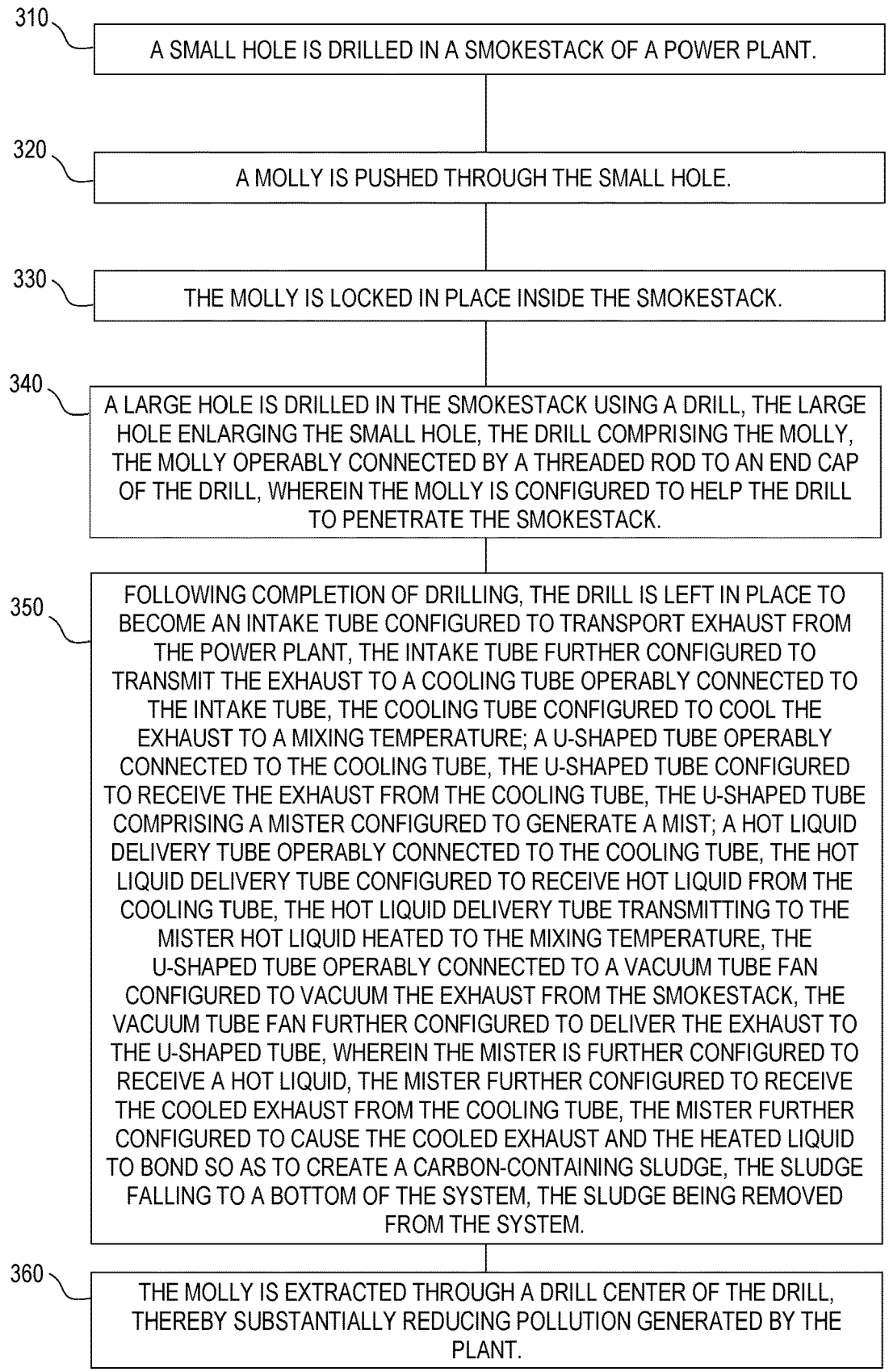
FIG. 3 is a flow chart illustrating a carbon capture filtration method.

FIG. 3 is a flow chart illustrating a carbon capture filtration method 300.

The order of the steps in the method 300 is not constrained to that shown in FIG. 3 or described in the following discussion. Several of the steps could occur in a different order without affecting the final result.

In step 310, a small hole is drilled in a smokestack of a power plant. Block 310 then transfers control to block 320.

In step 320, a molly is pushed through the small hole. Block 320 then transfers control to block 330.

In step 330, the molly is locked in place inside the smokestack. Block 330 then transfers control to block 340.

In step 340, a large hole is drilled in the smokestack using a drill, the large hole enlarging the small hole, the drill comprising the molly, the molly operably connected by a threaded rod to an end cap of the drill, wherein the molly is configured to help the drill to penetrate the smokestack. Block 340 then transfers control to block 350.

In step 350, following completion of drilling, the drill is left in place to become an intake tube configured to transport exhaust from the power plant, the intake tube further configured to transmit the exhaust to a cooling tube operably connected to the intake tube, the cooling tube configured to cool the exhaust to a mixing temperature; a U-shaped tube operably connected to the cooling tube, the U-shaped tube configured to receive the exhaust from the cooling tube, the U-shaped tube comprising a mister configured to generate a mist; a hot liquid delivery tube operably connected to the cooling tube, the hot liquid delivery tube configured to receive hot liquid from the cooling tube, the hot liquid delivery tube transmitting to the mister hot liquid heated to the mixing temperature, the U-shaped tube operably connected to a vacuum tube fan configured to vacuum the exhaust from the smokestack, the vacuum tube fan further configured to deliver the exhaust to the U-shaped tube, wherein the mister is further configured to receive a hot liquid, the mister further configured to receive the cooled exhaust from the cooling tube, the mister further configured to cause the cooled exhaust and the heated liquid to bond so as to create a carbon-containing sludge, the sludge falling to a bottom of the system, the sludge being removed from the system. Block 350 then transfers control to block 360.

In step 360, the molly is extracted through a drill center of the drill, thereby substantially reducing pollution generated by the plant. Block 360 then terminates the process.

For example, as attested by two third-party reports by McCampbell Analytics that are attached to this application as Appendices 1 and 2, the system removes over 95% of exhaust. Appendices 1 and 2 show that embodiments of the invention remove from the exhaust the same pollutants that are comprised in exhaust from coal plants, namely, one or more of carbon dioxide, carbon monoxide, hydrocarbons, sulfur dioxide, nitrous oxide, nitrogen dioxide, mercury, and other exhaust particles Embodiments of the invention were also tested using as an emissions machine, the Model S54-311B exhaust analyzer manufactured by SPX Corporation, of Charlotte, North Carolina, now part of Bosch Automotive Service Solutions of Warren, Michigan under the name OTC Tools (www.otc-tools.com). Table 1 presents in tabular form experimentally obtained data obtained using the SPX Corporation Model S54-311B. The data in Table 1 demonstrates that embodiments of the invention remove a great majority of hydrocarbons, nitrous oxide, carbon monoxide, and carbon dioxide. The effectiveness of embodiments of the invention is in fact clearly visible to the naked eye of an untrained observer. Before embodiments of the invention are activated, smoke emerging from a coal plant will be seen as thick, black, and steadily flowing out of the coal plant. Following activation of embodiments of the invention, output is dramatically transformed to a substantially clear, steamy appearance that is much clearer with substantially reduced levels of black smoke.

TABLE 1

| Emission Type | Emissions Prior to Invention | Emissions Using Invention |
|---|---|---|
| Hydocarbons | 54 PPM | 0 PPM |
| Nitrous Oxide | 33 PPM | 9 PPM |
| Carbon Monoxide | 0.42% | 0.0% |
| Carbon Dioxide | 1.9% | 0.0% |
| $O_2$ | 16.7% | 21.4% |

Using this exhaust analyzer, embodiments of the invention were demonstrated to have dramatically reduced emissions of hydrocarbons from 54 parts per million (ppm) to 0 ppm, which is a reduction of 100%, to have reduced nitrous oxide emissions from 33 ppm to 9 ppm, to have reduced carbon monoxide emissions from 42% to 0%, again a reduction of 100%, and to have reduced carbon dioxide emissions from 1.9% to 0.1%. a reduction of 95%.

An advantage of embodiments of the invention is that parts of the system can be replaced without having to shut down the power plant. An additional advantage of embodiments of the invention is that the power plant does not need to be shut down for the drilling process. A further of embodiments of the invention is that all parts of the system can be replaced without having to shut down the power plant. A further advantage of embodiments of the invention is that one or more of removal and replacement of one or more of the compressors, the misters, the pollutant vacuum tubes, and the vacuum tube fans should take less than four hours after practice and can be accomplished without turning off smokestack operation.

Another advantage of embodiments of the invention is that the U-shaped tube fan can be quickly replaced using a crane. Another advantage of embodiments of the invention is they provide high-efficiency cooling. A still other advantage of embodiments of the invention is that the system and method utilize a drill that does not disrupt the structural integrity of the smokestack.

A still further advantage of embodiments of the invention is that it provides as output valuable carbon usable for one or more of CNT's and fertilizer. Another advantage of embodiments of the invention is that the system can remove approximately 3.2 million tons of pollution from a typical plant's annual output. A yet further advantage of embodiments of the invention is an estimated installation price in year 2021 of approximately $600,000 or less not including labor costs. A still further advantage of embodiments of the invention is an installation time of approximately twenty-one days or less. A yet further advantage of embodiments of the invention is personnel requirements for installation of three crews, each crew comprising ten or more people. Another advantage of embodiments of the invention is the ability to bring a smokestack to at least an approximately 95% clean status. One more advantage of embodiments of the invention is that the carbon capture filtration system captures exhaust pollution generated by the coal-burning smokestack and produces a carbon-rich sludge that can then be one or more of stored and prepared for transport.

A still further advantage of embodiments of the invention is that the generally oval-shaped tubes allow a maximum amount of flow while having a maximum amount of surface area in which to cool. A yet additional advantage offered by embodiments of the invention is that the drill offers a reduced level of vibration. A further advantage of embodiments of the invention is that an acidic liquid such, as for example, cranberry juice helps minimize entry of carbon into the misters and resulting clogging of the misters. Another advantage of embodiments of the invention is that the sensors can detect an amount of exhaust so that the system can promote maximum bonding by adjusting one or more of a speed and a mister configuration. A yet further advantage of embodiments of the invention is that the filtration system comprises two layers of screen that are easily replaced. A still further advantage is that the filters can easily be changed without having to shut down the power plant.

A yet further advantage of embodiments of the invention is that it is easy and inexpensive to perform one or more of system installation, system maintenance, and system repair without a need to shut down the power plant, even for a short period of time.

An additional advantage of embodiments of the invention is the removability of the adapter plate facilitates replacement of one or more of one or more of parts, the fan, and the cooling tube.

Another advantage of embodiments of the invention is that the three refrigerant-based cooling tubes can remove an immense amount of heat from the exhaust. A further advantage is that the adapter plate adjusts to different distances from the smokestack to the U-shaped tube.

Another advantage of embodiments of the invention is that the use of non-corrosive cranberry juice in the liquid-based coolers can reduce buildup of carbon on the misters and prevent clogging of the misters.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

For example, the carbon capture filtration system and method can be used in any power plant that emits smoke. For example, the carbon capture filtration system and method can be used in one or more of a petroleum power plant, a natural gas power plant, and another type of power plant. For example, a pollutant vacuum tube may comprise more than one intake tube. For example, a pollutant vacuum tube may comprise more than one cooling tube. For example, a pollutant vacuum tube may comprise more than one intake tube while comprising only one cooling tube. For example, a pollutant vacuum tube may comprise more than one cooling tube while comprising only one intake tube.

For example, where space is limited, or possibly to save money on construction costs, the U-shaped tube may comprise a single branch instead of the preferable embodiments that include both the first U-shaped tube branch 142A and the second U-shaped tube branch 142B. According to such embodiments, all the components of the system 100 shown in FIG. 1 will be present except for the U-shaped tube fan 166, with the U-shaped tube 140 instead comprising a single vertical tower containing the misters and all the other depicted components of the U-shaped tube 140. The U-shaped tube 140 will of course not be substantially shaped like a letter U in these embodiments and will still comprise a U-shaped tube exhaust port 168 at a top 103 of the system 100. These embodiments will function similarly to the preferred embodiments although with reduced effectiveness at removing the pollutants.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A carbon capture filtration system configured for installation to a power plant, comprising:
    an intake tube operably connected to a smokestack of the power plant, the intake tube configured to transport exhaust from the smokestack, the intake tube comprising a drill configured to create a hole in the side of the smokestack usable to receive exhaust generated by the power plant, the drill configured to remain in place and function as the intake tube;

a cooling tube operably connected to the intake tube, the cooling tube configured to receive the exhaust from the intake tube, the cooling tube further configured to cool the exhaust to a mixing temperature;

a U-shaped tube operably connected to the cooling tube, the U-shaped tube configured to receive the exhaust from the cooling tube, the U-shaped tube comprising a mister configured to generate a mist;

a hot liquid delivery tube operably connected to the cooling tube, the hot liquid delivery tube configured to receive hot liquid from the cooling-tube, the hot liquid delivery tube transmitting to the mister the hot liquid, wherein the hot liquid is heated to the mixing temperature;

and a vacuum tube fan operably connected to the U-shaped tube, the vacuum tube fan configured to vacuum the exhaust from the smokestack, the vacuum tube fan further configured to deliver the exhaust to the U-shaped tube, wherein the mister is further configured to receive the hot liquid, the mister further configured to cause the cooled exhaust and the heated liquid to bond so as to create a carbon-containing sludge, the sludge falling to a bottom of the carbon capture filtration system, the sludge being removed from the carbon capture filtration system, thereby substantially reducing pollution generated by the power plant.

2. The carbon capture filtration system of claim 1, wherein the U-shaped tube is shaped like a letter U.

3. The carbon capture filtration system of claim 2, wherein the U-shaped tube comprises two U-shaped tube branches, a first U-shaped tube branch that is operably connected to the cooling tube at a U-shaped tube-cooling tube junction, the U-shaped tube further comprising a second U-shaped tube branch that is distal from the U-shaped tube-cooling tube junction.

4. The carbon capture filtration system of claim 1, wherein the carbon capture filtration system generates reusable carbon.

5. The carbon capture filtration system of claim 1, wherein the cooling tube slants downward at approximately a 5 degree angle towards the U-shaped tube, allowing exhaust particles that drop to the bottom of the cooling tube to flow by gravity to the U-shaped tube.

6. The carbon capture filtration system of claim 1, wherein the cooling tube comprises a cooler.

7. The carbon capture filtration system of claim 6, wherein the cooler comprises one or more of a refrigerant-based cooler and a liquid-based cooler.

8. The carbon capture filtration system of claim 1, wherein the carbon capture filtration system further comprises a slurry processing assembly, the slurry processing assembly located at a bottom of the U-shaped tube.

9. The carbon capture filtration system of claim 8, wherein the U-shaped tube comprises the slurry processing assembly, the slurry processing assembly separating hot liquid from the sludge.

10. The carbon capture filtration system of claim 8, wherein the slurry processing assembly comprises a filter, the filter configured to separate the hot liquid from the sludge.

11. The carbon capture filtration system of claim 10, wherein the filter is positioned at a non-zero filter angle relative to the ground, causing the hot liquid to flow through the filter, while the sludge that is stopped by the filter slides down the filter to a bottom front of the slurry processing assembly.

12. The carbon capture filtration system of claim 10, wherein the slurry processing assembly further comprises a hot liquid cooler configured to cool the hot liquid, creating cool liquid.

13. The carbon capture filtration system of claim 12, wherein the carbon capture filtration system reuses the cool liquid to supply the cool liquid to the liquid-based coolers.

14. The carbon capture filtration system of claim 2, wherein the U-shaped tube further comprises a U-shaped tube fan, the U-shaped tube fan configured to draw the pollution upward into the U-shaped tube and toward a top of the carbon capture filtration system.

15. The carbon capture filtration system of claim 3, wherein the U-shaped tube fan is located in the second U-shaped tube branch.

16. The carbon capture filtration system of claim 15, wherein the U-shaped tube fan is configured to draw the exhaust upward into the second U-shaped tube branch.

17. The carbon capture filtration system of claim 14, wherein the carbon capture filtration system controls the bonding of the cooled exhaust and the heated liquid by varying one or more of a speed of the U-shaped tube fan and the mixing temperature.

18. The carbon capture filtration system of claim 1, wherein the pollution comprised in the sludge removed from the carbon capture filtration system comprises one or more of carbon dioxide, carbon monoxide, hydrocarbons, sulfur dioxide, nitrous oxide, nitrogen dioxide, and mercury.

19. A carbon capture filtration system configured for installation to a coal-fired power plant, comprising:

an intake tube operably connected to a smokestack of the coal-fired power plant, the intake tube configured to transport exhaust from the smokestack, the intake tube comprising a drill configured to create a hole in the side of the smokestack usable to receive exhaust generated by the plant, the drill configured to remain in place and function as the intake tube;

a cooling tube operably connected to the intake tube, the cooling tube configured to receive the exhaust from the intake tube, the cooling tube further configured to cool the exhaust to a mixing temperature, the cooling tube comprising a cooler, wherein the cooler comprises a liquid-based cooler;

a U-shaped tube operably connected to the cooling tube, the U-shaped tube configured to receive the exhaust from the cooling tube, wherein the U-shaped tube comprises a shape resembling a letter U, wherein the U-shaped tube comprises two U-shaped tube branches, a first U-shaped tube branch that is operably connected to the cooling tube at a U-shaped tube-cooling tube junction, the U-shaped tube further comprising a second U-shaped tube branch that is distal from the U-shaped tube-cooling tube junction, the U-shaped tube further comprising a mister configured to generate a mist;

a hot liquid delivery tube operably connected to the cooling tube, the hot liquid delivery tube configured to receive hot liquid from the cooling tube, the hot liquid delivery tube transmitting to the mister the hot liquid, wherein the hot liquid is heated to the mixing temperature, the second U-shaped tube branch further comprising a U-shaped tube fan configured to draw the exhaust upward into the second U-shaped tube branch and toward a top of the carbon capture filtration system, wherein the cooling tube slants downward at approximately a 5 degree angle towards the U-shaped tube, allowing exhaust particles that drop to the bottom of the cooling tube to flow by gravity to the U-shaped tube;

a vacuum tube fan operably connected to the U-shaped tube, the vacuum tube fan configured to vacuum the exhaust from the smokestack, the vacuum tube fan further configured to deliver the exhaust to the U-shaped tube, wherein the mister is further configured to receive the hot liquid, the mister further configured to cause the cooled exhaust and the heated liquid to bond so as to create a carbon-containing sludge; and a slurry processing assembly located at a bottom of the U-shaped tube, the slurry processing assembly separating hot liquid from the sludge, the slurry processing assembly comprising a filter, the filter configured to separate the hot liquid from the sludge, wherein the filter is positioned at a non-zero filter angle relative to the ground, causing the hot liquid to flow through the filter, while the sludge that is stopped by the filter slides down the filter to a bottom front of the carbon capture filtration system, the sludge falling to a bottom of the carbon capture filtration system, the sludge being removed from the carbon capture filtration system, the slurry processing assembly further comprises a hot liquid cooler configured to cool the hot liquid, creating cool liquid, the carbon capture filtration system reusing the cool liquid to supply the cool liquid to the liquid-based cooler, wherein the carbon capture filtration system controls the bonding of the cooled exhaust and the heated liquid by varying one or more of a speed of the U-shaped tube fan and the mixing temperature the carbon capture filtration system thereby substantially reducing pollution generated by the power plant, wherein the pollution comprised in the sludge removed from comprises one or more of carbon dioxide, carbon monoxide, hydrocarbons, sulfur dioxide, nitrous oxide, nitrogen dioxide, and mercury, the carbon capture filtration system thereby generating reusable carbon.

20. A carbon capture filtration method using the carbon capture filtration system recited in claim 1, comprising:

drilling a small hole in a smokestack of a power plant;

pushing a molly through the small hole;

locking the molly in place inside the smokestack;

drilling a large hole in the smokestack using a drill, the large hole enlarging the small hole, the drill comprising the molly, the molly operably connected by a threaded rod to an end cap of the drill, wherein the molly is configured to help the drill to penetrate the smokestack;

following completion of drilling, allowing the drill to stay in place to become an intake tube configured to transport exhaust from the power plant;

transmitting the exhaust to a cooling tube using an intake tube operably connected to the cooling tube;

cooling the exhaust to a mixing temperature using the cooling tube;

receiving the exhaust from the cooling tube using a U-shaped tube operably connected to the cooling tube, the U-shaped tube comprising a mister configured to generate a mist receiving hot liquid from the cooling tube using a hot liquid delivery tube operably connected to the cooling tube;

heating the hot liquid to the mixing temperature using the hot liquid delivery tube;

transmitting to the mister the hot liquid using the hot liquid delivery tube, wherein the mister is further configured to receive the hot liquid;

vacuuming the exhaust from the smokestack using a vacuum tube fan configured to vacuum the exhaust from the smokestack, the vacuum tube fan operably connected to the U-shaped tube;

delivering the exhaust to the U-shaped tube using the vacuum tube fan;

bonding the cooled exhaust and the heated liquid so as to create a carbon-containing sludge, the sludge falling to a bottom of the U-shaped tube;

removing the sludge from the U-shaped tube;

and extracting the molly through a drill center of the drill, thereby substantially reducing pollution generated by the power plant.

* * * * *